US007883405B2

(12) United States Patent
Robb

(10) Patent No.: US 7,883,405 B2
(45) Date of Patent: Feb. 8, 2011

(54) LOTTERY AND GAMING SYSTEMS WITH MULTI-THEME INSTANT WIN GAMES

(75) Inventor: Arthur S. Robb, Hackensack, NJ (US)

(73) Assignee: Scientific Games International, Inc., Newark, DE (US)

( * ) Notice: Subject to any disclaimer, the term of this patent is extended or adjusted under 35 U.S.C. 154(b) by 134 days.

(21) Appl. No.: 10/670,555

(22) Filed: Sep. 23, 2003

(65) Prior Publication Data

US 2005/0064925 A1 Mar. 24, 2005

(51) Int. Cl.
*A63F 13/00* (2006.01)

(52) U.S. Cl. ............................ 463/17; 463/16; 463/18; 463/20; 463/42

(58) Field of Classification Search ............ 463/16–18, 463/20, 42
See application file for complete search history.

(56) References Cited

U.S. PATENT DOCUMENTS 5,158,293 A * 10/1992 Mullins ...................... 273/139
5,398,932 A * 3/1995 Eberhardt et al. ............. 463/29
5,451,052 A 9/1995 Behm et al.
5,550,746 A * 8/1996 Jacobs ........................ 700/231
5,628,684 A * 5/1997 Bouedec ...................... 463/17
5,726,898 A * 3/1998 Jacobs ........................ 700/231
5,768,142 A * 6/1998 Jacobs ........................ 700/231
5,772,510 A * 6/1998 Roberts ....................... 463/17
5,772,511 A * 6/1998 Smeltzer ...................... 463/17
5,934,671 A * 8/1999 Harrison ..................... 273/139
6,086,477 A * 7/2000 Walker et al. ................ 463/17
6,224,055 B1 * 5/2001 Walker et al. ............... 273/139
6,588,747 B1 * 7/2003 Seelig ..................... 273/138.1
6,620,046 B2 * 9/2003 Rowe .......................... 463/25
6,648,755 B1 * 11/2003 Luciano et al. ............... 463/17
6,786,824 B2 * 9/2004 Cannon ........................ 463/42
2002/0187825 A1 * 12/2002 Tracy et al. .................. 463/17
2003/0050109 A1 * 3/2003 Caro et al. .................... 463/17
2004/0185931 A1 * 9/2004 Lowell et al. ................. 463/17
2004/0204222 A1 * 10/2004 Roberts ....................... 463/17
2004/0259631 A1 * 12/2004 Katz et al. .................... 463/25
2004/0266514 A1 * 12/2004 Penrice ........................ 463/18

* cited by examiner

*Primary Examiner*—James S. McClellan
*Assistant Examiner*—Sunit Pandya
(74) *Attorney, Agent, or Firm*—Dority & Manning, P.A.

(57) ABSTRACT

In one aspect, the invention is directed to a method of conducting an instant win game in combination with a base wagering game. The method may include receiving a base wagering game entry and a base wagering game wager from a player, and receiving an instant win game wager from the player. The method may further include storing a game theme indicator, storing a plurality of instant win game outcome display themes, and determining an outcome of the instant win game for the player. Still further, the method may include displaying the outcome of the instant win game to the player, wherein the outcome may be displayed with one of the plurality of instant win game outcome display themes, and with the one of the plurality of instant win game outcome display themes corresponding to the stored game theme indicator. In addition, the method may include awarding the player an instant win game prize corresponding to the outcome of the instant win game.

20 Claims, 19 Drawing Sheets

LOTTERY AND GAMING SYSTEMS WITH MULTI-THEME INSTANT WIN GAMES

BACKGROUND

This invention relates to lottery systems for conducting lottery games and casino gaming systems for gaming units such as slot machines and video poker machines and, more particularly, to incorporating multi-theme instant win games in such lottery and gaming systems.

Various lottery and gaming systems incorporating themes for the lottery and casino games have been previously described. For example, U.S. Pat. No. 6,375,568 to Roffman et al. discloses an interactive gaming process and system. The system comprises a plurality of gaming machines to be played by a plurality of players. The system can be configured such that the gaming machines are either located in a casino or at internet locations. Each gaming machine comprises a wagering game and a theme game. The wagering game has features that correspond to the theme game wherein the results of the wagering game influence the results of the theme game as the wagering game is being played. The system also includes a controller for electronically linking the gaming machines and providing stimuli to the gaming machines to affect gaming machine outputs that are impartial and random. In one embodiment, the plurality of players play the wagering game as a group wherein if one players theme game results meet predetermined criteria, that particular player will play for the group. The group will then have the opportunity to split a jackpot. In another embodiment, the plurality of players play as a group wherein activation of each players wagering game either helps or hinders the group as a whole in its effort to achieve a predetermined goal. In a further embodiment, the players play their respective wagering game to directly compete against each other in the theme game. The results of the wagering games determine the winnings of each player, the eventual winner of the theme game and/or any predetermined jackpot.

U.S. Patent Application Publication No. 200/0151349 to Joshi discloses a gaming machine having features for increasing player appeal. The machine generally includes a processor, a display, and memory device. The processor monitors time signals from a clock and randomly selects one of a plurality of outcomes of the gaming machine in response to a wager amount. The display displays visual elements to be viewed by the player. The memory device is coupled to the processor and stores at least two data sets for producing at least two different types of visual elements. The processor selects one of at least two data sets in response to the processor monitoring a time signal corresponding to a predetermined time. The two different types of visual elements may be of a standard motif and a holiday motif, and the predetermined time is the holiday or one or more days before and/or after the holiday. Alternatively, the predetermined time can be at least one minute within one day, and the corresponding visual elements can be related to the time of day. The predetermined time can be a season of the year and the corresponding visual elements can be indicative of the season. The gaming machine may also include audio speakers and audio elements that replace the changing visual elements, or audio and video elements can be displayed in unison as a function of the time. The machine may also contemplate maintaining player appeal by providing a modified payout structure as a function of time.

SUMMARY OF THE INVENTION

In one aspect, the invention is directed to a method of conducting an instant win game in combination with a base wagering game. The method may include receiving a base wagering game entry and a base wagering game wager from a player, and receiving an instant win game wager from the player. The method may further include storing a game theme indicator, storing a plurality of instant win game outcome display themes, and determining an outcome of the instant win game for the player. Still further, the method may include displaying the outcome of the instant win game to the player, wherein the outcome may be displayed with one of the plurality of instant win game outcome display themes, and with the one of the plurality of instant win game outcome display themes corresponding to the stored game theme indicator. In addition, the method may include awarding the player an instant win game prize corresponding to the outcome of the instant win game.

In another aspect, the invention is directed to a gaming system for conducting an instant win game in combination with a base wagering game. The gaming system may include a plurality of terminal units, with each of the terminal units including an input device that may allow a player to make a plurality of input selections, a terminal unit memory device, a currency-accepting mechanism that may be capable of allowing the player to deposit a medium of currency, a value-dispensing mechanism that may be capable of dispensing value to the player, an output device, and a terminal unit controller operatively coupled to the display unit, the input device, the terminal unit memory device, the currency-accepting mechanism, the value-dispensing mechanism, and the output device. The gaming system may also include a host computer operatively coupled to the plurality of terminal units, wherein the host computer may include a host computer memory device and a host computer controller operatively coupled to the host computer memory device.

The terminal unit controller may programmed to allow a player to enter a base wagering game entry at the input device, and to allow a player to make a base wagering game wager and an instant win game wager at the currency-accepting mechanism. One of the terminal unit controller and the host computer controller may be programmed to store a game theme indicator at the corresponding one of the terminal unit memory device and the host computer memory device, to store a plurality of instant win game outcome display themes at the corresponding one of the terminal unit memory device and the host computer memory device, and to determine an outcome of the instant win game. Further, the terminal unit controller may be programmed to display the outcome of the instant win game at the output device with the outcome being displayed with one of the plurality of instant win game outcome display themes corresponding to the game theme indicator, and to cause the value-dispensing mechanism to dispense an instant win game prize corresponding to the outcome of the instant win game.

In a further aspect, the invention is directed to a terminal unit for conducting an instant win game in combination with a base wagering game. The terminal unit may include an input device that allows the player to make a plurality of input selections, a memory device, a currency-accepting mechanism that may be capable of allowing the player to deposit a medium of currency, a value-dispensing mechanism that may be capable of dispensing value to the player, an output device, and a controller operatively coupled to the display unit, the input device, the memory device, the currency-accepting mechanism, the value-dispensing mechanism, and the output device. The controller may be programmed to allow a player to enter a base wagering game entry at the input device, to allow a player to make a base wagering game wager and an instant win game wager at the currency-accepting mechanism, and to store a game theme indicator at the memory device. The controller may also be programmed to store a plurality of instant win game outcome display themes at the memory device, to determine an outcome of the instant win game, to display the outcome of the instant win game at the output device with the outcome being displayed with one of the plurality of instant win game outcome display themes corresponding to the game theme indicator, and to cause the value-dispensing mechanism to dispense an instant win game prize corresponding to the outcome of the instant win game.

Additional aspects of the invention are defined by the claims of this patent.

DETAILED DESCRIPTION OF VARIOUS EMBODIMENTS

Figure 1:
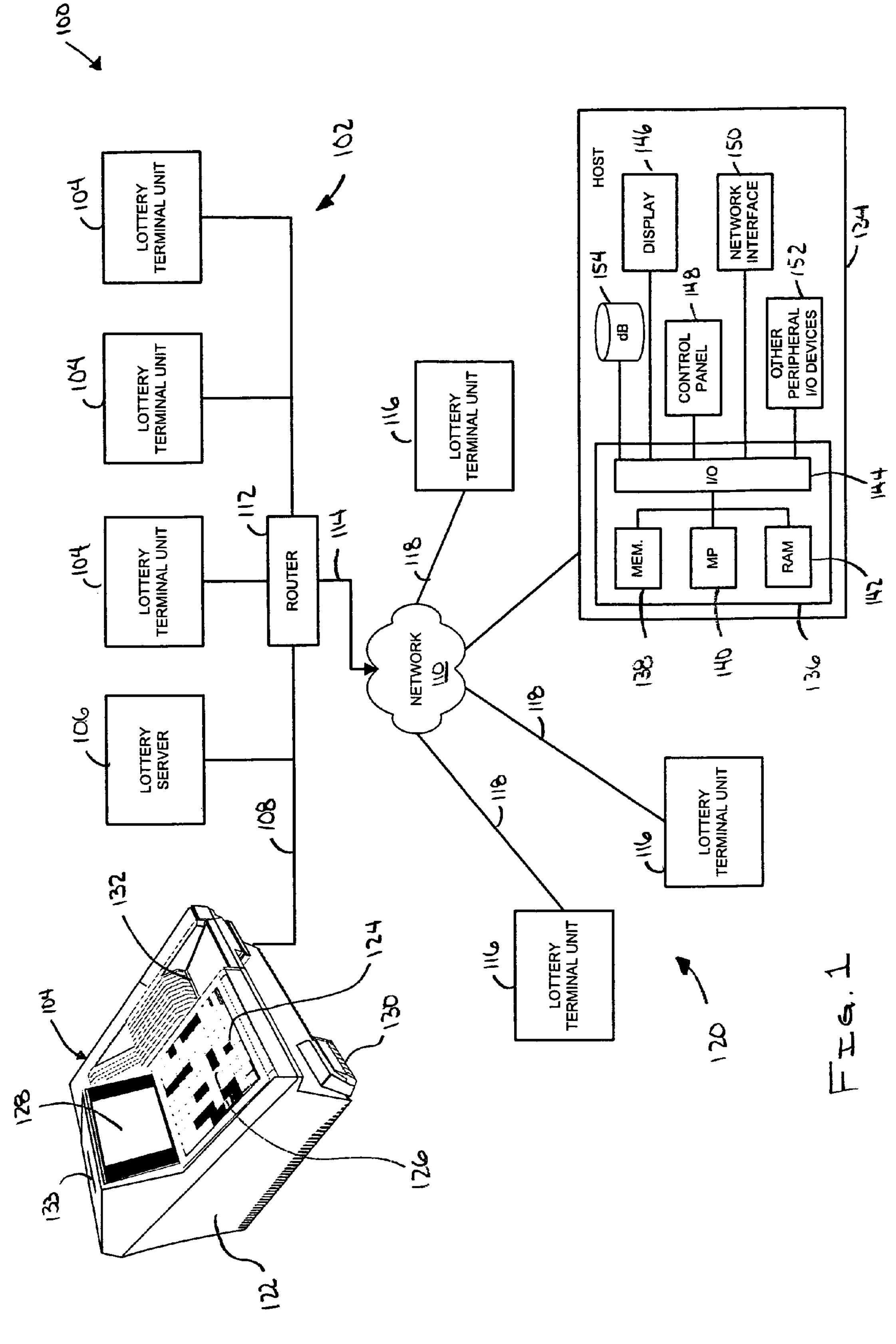
FIG. 1 is a block diagram of an embodiment of a networked lottery system.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

A multi-theme game as described herein may have application in lottery systems, casino gaming systems and in other systems wherein an instant win game may be integrated into the existing functionality of the system. An instant win game may be provided in addition to a lottery or casino game, and may be provided for no additional charge or for an additional wager placed by the lottery or casino player. Typical instant win games, such as scratch-off games, are based on multi-tier probability tables wherein each possible winning result for the game occurs in a predetermined percentage of all outcomes of the instant win game. For example, in a given instant win game, for a $1.00 wager the probability of having a $1.00 winning outcome may be 1 in 10 occurrences of the instant win game, while the probability of having a $100 winning outcome is significantly lower, such as 1 in 500 occurrences of the instant win game.

One alternative for implementing an instant win game in a lottery system, or in a casino gaming system wherein the gaming units print and dispense tickets as credit vouchers or receipts, may be to print the instant win game on a ticket dispensed to the customer along with the other information related to the underlying lottery or casino game. For example, participants in a state or multi-state lottery game may be provided with the opportunity to place an additional wager on an instant win game accompanying the lottery game. If the player elects to pay the wager amount for the instant win game, the lottery ticket printed by the lottery terminal may include information relating to the lottery game along with information relating to the outcome of the instant win game. If the instant win game is a blackjack game, for example, the information printed on the ticket may show numbers and letters representative of cards in a player's hand and in a dealer's hand that may be totaled to represent the outcome of the instant win game. The player may win if the player's cards total an amount greater than the dealer's cards and are less than or equal to twenty-one. As another example, in a casino gambling unit that prints and dispenses prize vouchers or receipts to the player, the printer may also print information relating to the outcome of an instant win game on the vouchers and/or receipts.

Many instant win games have short life cycles, with sales peaking when the instant game is introduced and steadily declining for the duration of time that the instant game is offered. In order to attempt to maximize the sales of scratch-off instant win games, several different scratch-off instant win games may be rotated with a different scratch-off instant win game being introduced into the market as sales for the previously introduced scratch-off instant win game decrease. As described herein, a similar concept may be implemented for instant win games offered in conjunction with lottery games and casino gaming unit vouchers and receipts. As previously discussed, the instant win game outcome may be printed on the tickets, vouchers or receipts with a particular game theme, such as blackjack, as detailed above, football, Bingo, or any other theme that may be desired to display the outcome of the instant win game to the player. In one implementation in a lottery network, for example, lottery terminal units may be programmed with software to cause the printer to print instant game outcomes on lottery tickets with one of a plurality of available game themes. When a player purchases a lottery ticket and places an additional wager to play the instant win game, a game theme indicator provided by a central host computer and/or stored at the lottery terminal unit may cause the lottery terminal unit to print the outcome of the instant win game on the ticket with a corresponding one of the available game themes. When it is desired to rotate to a different instant win game theme, the game theme indicator provided by the host and/or stored at the lottery terminal unit may be changed so that a different one of the plurality of available game is printed on the lottery tickets for the instant win game by the lottery terminal units. The instant win game themes may similarly be programmed into casino gaming systems so that instant win games on casino vouchers or receipts may be printed using one of a plurality of available game themes that may be rotated as desired.

Lottery Network

FIG. 1 illustrates one possible embodiment of a lottery network 100 that may implement a multi-theme instant win game in conjunction with a lottery-type game. Referring to FIG. 1, the lottery network 100 may include a first group or network 102 of lottery terminal units 104 operatively coupled to a lottery network computer or server 106 via a network data link or bus 108. The lottery network 100 may be coupled to a network 110, which may be, for example, the Internet, a wide area network (WAN), or a local area network (LAN) through a network hub or router 112 via a first network link 114. In one possible configuration, the first network 102 may be a state lottery system operating within an individual state or region of states. In this configuration, the individual lottery terminal units 104 may be interconnected to a central system for tracking and coordination of the state lottery system, including issued tickets, drawn numbers, and/or amounts waged.

The lottery network 100 may further include other lottery terminal units 116 that may be directly connected to the network 110 through a plurality of direct network links 118, thereby eliminating the need for the bus 108, router 112 or other networking equipment. Each lottery terminal unit 116 in this configuration may represent a group of lottery retailers participating in the state lottery, as described above, or a plurality of the lottery terminal units 116 may be grouped together to form a lottery node 120. The lottery nodes 120, in turn, may be directly connected and/or multiplexed to the network 110 via the direct network links 118. Further, the direct network links 118 may represent secure communications channels physically hardened against tampering and/or the communications may be encrypted to prevent unauthorized access to information transmitted thereon.

FIG. 1 further illustrates a perspective view of one possible embodiment of a lottery terminal unit 104. Although the following description relates to the design of the lottery terminal unit 104 depicted in FIG. 1, it should be understood that the lottery terminal units 104 and 116 may include similar features or may be configured with functionality to allow the entry of the information required for a player to participate in a lottery game. The exemplary lottery terminal unit 104 may include a housing or casing 122, and one or more input and output devices, which may be, among other things, a control panel 124 having a plurality of input keys 126, a display 128, a value input device such as a card reader 130, a lottery play slip or ticket reader 132, and a lottery ticket printer 133. The lottery play slip reader 132 may be configured to read bar codes, user selections, magnetically stored information or any other desired input information or media used to encode information on a play slip or lottery ticket.

The input keys 126 may allow the player or sales agent to select the game to be played, input the value to be wagered, manually enter the selected lottery characters, and input any other information necessary to play a given lottery game. The display 128 may be a LCD, a CRT, a touch-screen capable of receiving and displaying information, or any other suitable device capable of displaying the information input via the input keys 126, the lottery play slip reader 132 or the touch-screen input. The value input device may include any device that can accept value or a wager from a customer, such as the card reader 130 or an optical currency collector. The value input device may further be integrated with external devices, such as cash registers or other retail terminals, communicatively connected to the lottery terminal unit 104, to exchange information necessary to receive and record the wagering transactions. The lottery ticket printer 133 may be used to print or otherwise encode lottery tickets with information selected or required to play a given lottery game. Further, the lottery ticket printer 133 may provide lottery tickets, or even completed lottery slips if the selections were generated automatically, that could be used by the player in other lottery terminal units 116 equipped with lottery play slip or ticker readers 132.

Moreover, the lottery terminal units 104, 116 and lottery nodes 120 may include centralized or shared display mechanisms such as a scrolling digital signs or messaged boards configured to display the outcome of a completed lottery game and advertises or attract players to upcoming games. In one exemplary configuration, at least one lottery terminal unit 104 or 116 includes software for generating graphics and is communicatively connected to an external LCD suitable for displaying graphics. Upon completion of a lottery drawing, the results or winning information can be formatted by the graphical software and displayed, in an eye-catching manner, on the external LCD. Alternatively, the graphical software may be stored on a peripheral device, such as a CD-ROM, and the result of the lottery drawing communicated thereto for formatting and display.

The network 110, and hence the individual lottery terminal units 104 and 116, may be communicatively connected to a central host computer 134. The central host computer 134 may be a single networked computer, or a series of interconnected computers having access to the network 110 via a gateway or other known networking system. Generally, the central host computer 134 may include a central lottery controller 136 configured to manage, execute and control the individual lottery elements 104, 116 and 120 and the routines used to play the various lottery games. The central lottery controller 136 may include a memory 138 for storing lottery programs and routines, a microprocessor 140 (MP) for executing the stored programs, a random access memory 142 (RAM) and an input/output bus 144 (I/O). The memory 138, microprocessor 140, RAM 142 and the I/O bus 144 may be multiplexed together via a common bus, as shown, or may each be directly connected via dedicated communications lines, depending on the needs of the lottery system 100.

Further, the central lottery controller 136 may be directly connected, hardwired, or indirectly connected through the I/O bus 144 to external components such as a display 146, a control panel 148, a network interface device 150 and other peripheral I/O devices 152. Examples of other peripherals device include, but are not limited to, storage devices, wireless adaptors, printers, and the like. In addition, a database 154 may be communicatively connected to the central lottery controller 136 and provide a data repository for the storage and correlation of information gathered from the individual lottery terminal units 104, 116 or lottery nodes 120. The information stored within the database 154 may be information relating to individual lottery terminal units 104, 116 such as terminal specific information like a terminal identification code, sales agent code, and location for each lottery ticket printed. The database 154 may further include ticket specific information such as the type of game played (Lotto, Pick-3, Pick-4 etc.), or game specific information such as the total lottery sales, drawing outcomes, amounts wagered, numbers selected by the players, and the like.

In operation, the central lottery controller 136 may operate as a clearing-house for the lottery terminal units 116 and the first lottery network 102, whereby the lottery network computer 106 collects, stores and analyzes status and operational information relating to each lottery terminal unit 104. For example, the lottery network computer 106 may continuously receive transactional data from the individual lottery terminal unit 104 indicative of the number of tickets sold and associated dollar amounts, and the lottery numbers and number order generated at each lottery terminal unit. The transactional data collected by the lottery network computer 106 may be communicated to the central host computer 134 continuously or may be processed into a batch format and transmitted periodically for storage in the database 154. If, for example, the central lottery controller 136 and the lottery network computer 106 are communicating continuously, it may be desirable for the central lottery controller 136 to execute the actual lottery routine and transmit the results to the lottery network computer 106 for distribution to the lottery terminal units 104 and directly to the lottery terminal units 116. In addition, it may be desirable for the central lottery controller 136 to include, via the peripheral device input 152, a scanner, such as the lottery play slip reader 132, for directly importing/reading manual selections into the database 154.

It will be understood that the lottery network 100 illustrated in FIG. 1 may alternatively represent the network layout within a gaming establishment providing a lottery-type game. In this alternate configuration, each stand-alone lottery terminal unit 104 may be an interactive player terminal capable of playing a variety of lottery or casino games, such as a lottery game, Keno, Bingo, video poker, video blackjack, slots, and the like. The lottery terminal units 104 may be distributed throughout a single gaming establishment or casino and connected with a LAN, or throughout multiple casino sites and connected with a WAN. Further, the LAN and/or WAN connecting each of the lottery terminal units 104 may include one or more separate and secure buses 108, routers 112, web servers, gateways and other networking equipment to provide continuous and/or redundant connectivity to the network 110. The network 110, configured in this manner, provides a system for players to collectively participate in a centralized lottery-type game. Further, the network 110 may include express gaming stations at which players may generate predefined or automatically selected lottery tickets simply by making a selection and a wager. As discussed above, the network 110 may be communicatively connected to the central host computer 134, the central lottery controller 136, and the database 142 to allow for implementation, storage, tracking and analysis of the lottery game.

The central host computer 134 may store the software for managing one or more lottery games offered in the lottery system 100. Some jurisdictions may limit the number of lottery games that may be offered by a lottery system. Consequently, once a lottery system offers the maximum number of lottery games allowed by the jurisdiction, it may be necessary to remove or otherwise decommission an existing lottery game in order to implement a new lottery game. Moreover, when a new game is implemented in the lottery system, it may be necessary to perform certification testing on the new lottery game to ensure compliance of the lottery game with the applicable gaming regulations. Therefore, it may be desirable to be able to reuse lottery game functionality in order to avoid certifying or recertifying lottery game software, and to conserve the limited number of available lottery game positions available in the lottery system.

Lottery Unit

Figure 2:
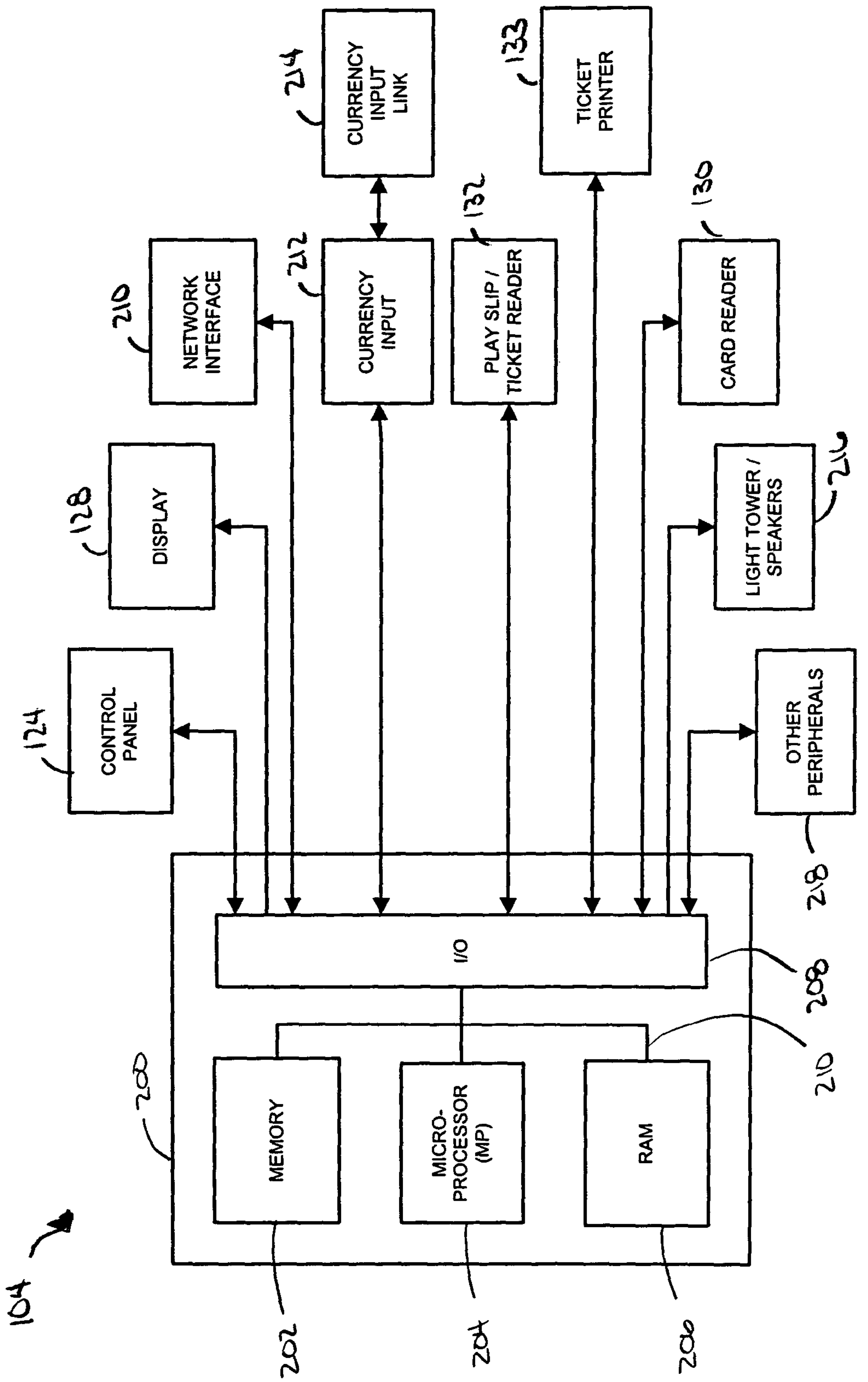
FIG. 2 is a block diagram of the electronic components of the lottery terminal unit shown in FIG. 1.

FIG. 2 illustrates a block diagram of an embodiment of the internal electronic components of the lottery terminal unit 104. The lottery terminal unit 116 may have the same or a different design, but may be configured to receive player entries into the lottery games and process winning lottery tickets. Referring to FIG. 2, the exemplary lottery terminal unit 104 may include a number of internal components such as a controller 200 having a program memory 202, a microcontroller or microprocessor (MP) 204, a random access memory (RAM) 206, and an input/output (I/O) bus 208, all of which may be interconnected via an address or data bus 210. It should be understood that while only one microprocessor 204 is shown herein, the controller 200 may be designed to support multiple microprocessors 204 arranged to operate in parallel or in any other known configuration. Similarly, the controller 200 may include multiple, and even redundant, program memories 202 and random access memories 206 to increase expandability, capacity and/or processing speed. The multiple processor and memory configurations may be used, for example, to isolate the individual lottery functions such as basic lottery operation, random number generation, information tracking, and the like. Although the I/O bus 208 is shown as a single addressable and integral block, it should be understood that direct I/O connections may be made, as well as any other desired I/O connection scheme. The program memory 202 and random access memory 206 may be implemented as a solid-state memory, an integrated circuit, a magnetically readable memory, and/or optically readable memories. Further, the program memory 202 may be read only memory (ROM) or may be read/write memory such as a hard disk. In the event that a hard disk is used as the program memory, the data bus 210 may comprise multiple address/data buses, which may be of differing types, and there may be a separate I/O circuit between the data buses.

FIG. 2 schematically illustrates that the controller 200 may be communicatively connected to the control panel 124, the display 128, the card reader 130, the lottery play slip or ticket reader 132 and the lottery ticket printer 133. The controller 200 may further be communicatively connected to a network interface card (NIC) or device 210, a currency input device 212 including a currency input link 214, and a light and speaker link 216. The network interface card 210 may be configured to allow the lottery terminal unit 104 to communicate information with other networked devices similarly connected to the network 110 using any know protocol or standard suitable for a lottery or network application. The currency input device 212 may be any kind of value input device discussed above, or may include a currency input link 214 communicatively connected to a cash register (not shown) or other device for tracking and/or totaling currency or transactions. The light and speaker link 214 may be used to integrate visual and/or audio displays into the design of the lottery terminal unit 104.

FIG. 2 illustrates the components 124, 128-132, and 210-218 directly connected the I/O bus 208 via dedicated circuits or conductors. However, it will be understood that different connections schemes may be used. For example, some of the components requiring limited communications with the controller 200 may be communicate via an auxiliary I/O bus (not shown) in a scheduled manner, while other components requiring fast communications or large data transfers may be directly connected to the I/O bus 208. Furthermore, depending on the needs of the system, some of the components may be directly connected to the microprocessor 184 without having to pass through the I/O bus 208.

Lottery Play Slips and Tickets

Regardless of the configuration or layout of the lottery system 100, it may often be the case that the lottery terminal unit 104, 116 will include lottery play slip or ticket readers 132 which may be used to scan an instant game ticket or a lottery play slip 300 (FIG. 3), which may, for example, be a play slip for a Keno game, completed by the player, and a lottery ticket 302 (FIG. 4), which may be, for example, a Keno game lottery ticket, previously generated at a lottery ticket printer 133, to determine whether the ticket contains a winning combination. The lottery play slip 300 and the lottery ticket 302 may be composed of paper, Mylar, cardboard or any other suitable printable or encodable material. The lottery play slip 300 and ticket 302 may include informational, instructional or security information such as a bar code, award details, authentication numbers, or any other desired information. Further, it will be understood that different ticket types and formats may be used depending on the theme, format and rules of the game. The lottery ticket 302 may be printed with any optically readable material such as ink, or encoded with data on a magnetic material, smart chip or other media for encoding data.

Figure 3:
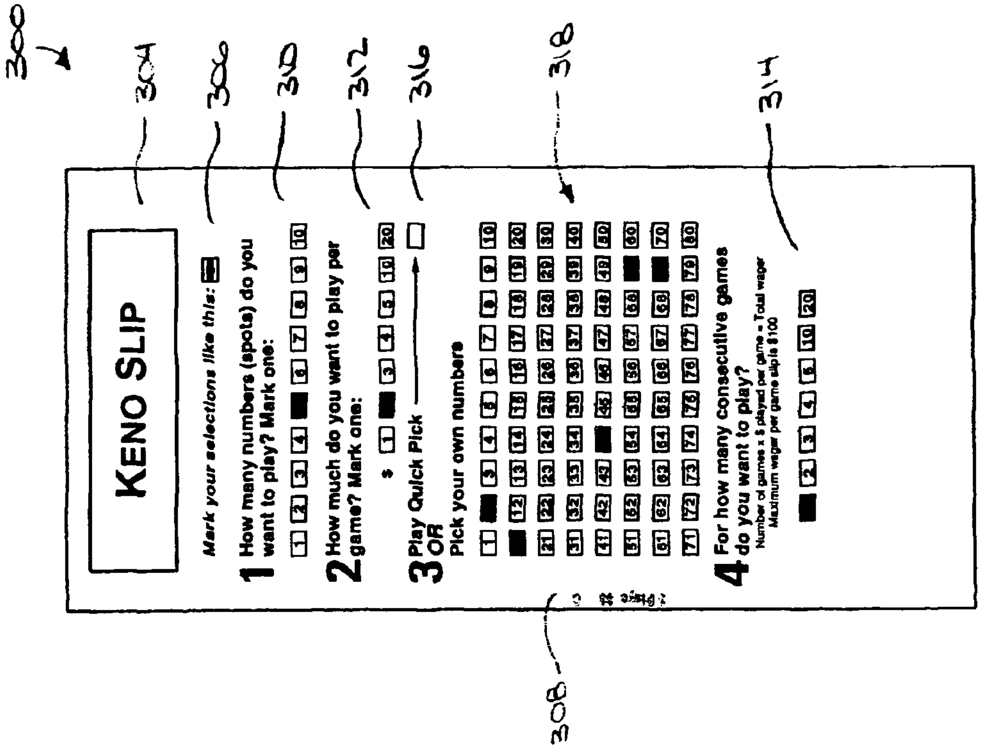
FIG. 3 illustrates an embodiment of a lottery play slip that may be read by the lottery terminal unit of FIG. 2.

Referring to FIG. 3, the lottery play slip 300 can be configured and arranged in any number of variations for use in lottery games such as Keno, Lotto, Powerball-style games, Pick-3 and Pick-4 games, and the like, but may typically include a number of common indicia or information. For example, the exemplary Keno play slip 300 may include a title 304 indicative of the associated game, a set of directions or instructions 306, and a plurality of game specific selections, as generally indicated by the numeral 308. The game specific selections may allow the player to define how many numbers or characters associated with the lottery game to play 310, the exact amount to be wagered 312, and the number of games or drawings to be entered 314. Further, the lottery play slip 300 may be arranged with indicia 316 to allow a player to play the lottery game with Quick Pick selections (i.e. selections automatically and randomly determined by one of the lottery terminal units 104, 116 or the central lottery controller 136), and/or with manual selection indicia 318 arranged to allow the player to select the player's entry from a predefined list of numbers, letters or characters associated with the lottery game. In this manner, the player or a sales agent can fill-out, code or otherwise record the information necessary to participate in a specific lottery game, and provide that information to a central collection point, such as the lottery terminal unit 104, 116 or the central host computer 136 for processing and/or recordation. The reverse side of the play slip 300 may also have indicia (not shown) thereon with information relating the lottery game, such as instructions on how to play the game, win and claim prizes, schedules or tables of prize amounts and odds of winning, requirements for playing or filling out play slips, lottery disclaimers, and the like.

The exemplary lottery play slip 300 illustrated in FIG. 3 is configured to allow the player to make entry in a Keno game. The player may select how many numbers or spots are to be matched in a given Keno game at 310, thereby decreasing the odds of winning and simultaneously increasing the potential payout of a winning selection. By selecting a Quick Pick at area 316, the player may allow the lottery terminal unit 104 to randomly select a plurality of numbers equal to the number of spots indicated at 310. However, the player may opt to manually select the numbers by choosing numbers, or spots, between 1 and 80, as indicated in the manual selection area 318. Finally, the manual or automatic selections may be consecutively played by indicating the desired number of games, for example one, two, three, four, five, ten or twenty, at area 314.

Figure 4:
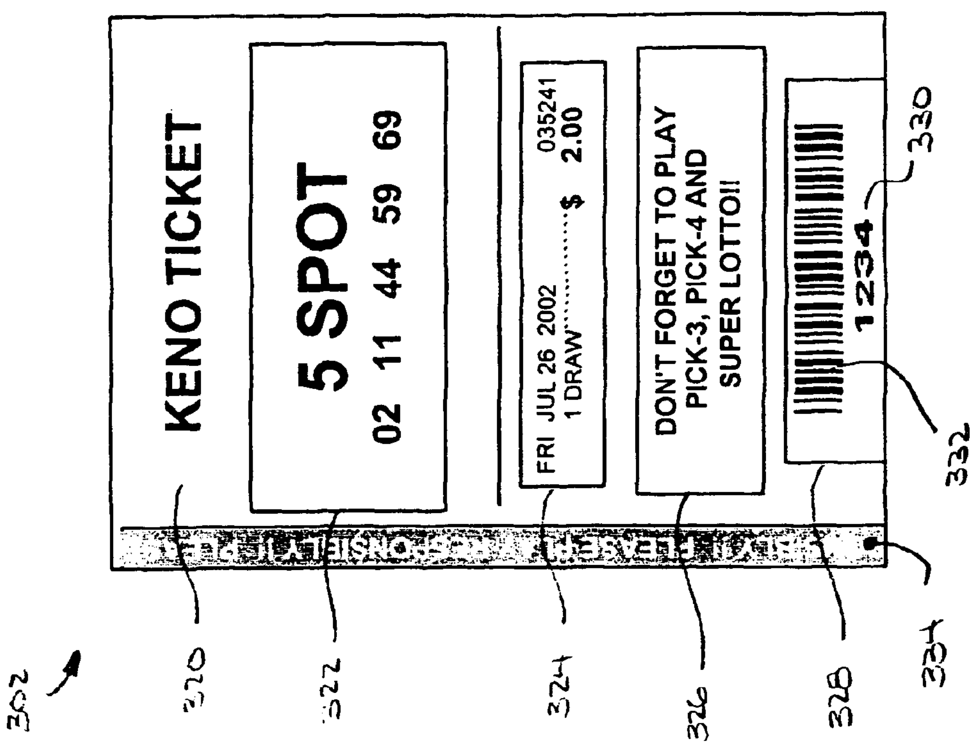
FIG. 4 illustrates an embodiment of a lottery ticket that may be generated by the lottery terminal unit of FIG. 2.

FIG. 4 illustrates the exemplary lottery ticket 302 that may be generated in response to the selections made by the player on the lottery slip 300. For example, the lottery ticket 302 may include a title 320 indicative of the game being played, a game area 322 that may provide results, confirmation information or other game-related information, and a status area 324 that may include wager information, drawing date, tracking information and the like. Further, the lottery ticket 302 may include an advertising area 326 where messages or other consumer information may be printed, and a coding area 328 that may have a tracking number 330 and a machine-readable code 332, such as a barcode, that may be read by the play slip/ticket reader 132 to retrieve information for the ticket. The tracking code 330 and graphical code 332 may be used to confirm the validity of the ticket, the location of purchase, amount of wager, numbers selected or any other desired information. The lottery ticket stock, or blank, may be preprinted with additional information such as, a public service message 334, a disclaimer, game rules or any other desired end-user license or contract information.

It will be understood that to play the exemplary Keno game described above, the player may manually fill-out the lottery play slip 300 using a pencil, pen or other input method, and the player slip 300 may be read by the lottery play slip reader 132 of the lottery terminal unit 116 to input the player's selections into the lottery system 100. Alternatively, the player may key-in the desired selections at the lottery terminal unit 104, or instruct a sales agent to key-in the desired selections. Once the player's selections are entered into the lottery system 100, the inputted data may then be used by the lottery terminal unit 104, the lottery server 106, and/or the central host computer 134 to generate the lottery ticket 302 with information corresponding to the player's selections. The ticket 302 may serve as the player's receipt, or the lottery terminal 104 unit may print an additional receipt for the player. At the same time, the information for the player selections may be stored in a database, such as in the memory of the lottery terminal unit 104 or server 106, in database 154 or memory 138 of central host computer 134, or other storage location for later use in ticket validation, auditing, compliance monitoring, and the like. At this point, the player may also pay for the wager and games being played.

Lottery Routine

In general, lotteries may be implemented as the networked games described above, or as an instant game. Networked lottery games, such as Lotto and Powerball-style games wherein players may enter a drawing at any one of a number of sales agent locations having lottery terminal units 104, 116, are typically communicatively connected through the network 110 to the central host computer 134, as described above. Lotto and Powerball-style games often offer multi-thousand or multimillion-dollar jackpots, in which five or six numbers are randomly drawn from a pool of twenty or more possible numbers, and the player(s) who has selected, or has had the system select, matching numbers is a winner. Network lotteries may further be implemented as a number game, in a "Pick-3" or "Pick 4" format, in which three or four numbers are drawn from the integers 0 through 9. Number games such as these, in contrast to typical Lotto or Powerball-style games, are often performed with replacements (e.g., the number 2 could be drawn twice) and may distinguish by order (e.g. 3-4-5 may be a different outcome than 5-4-3).

The instant or "scratch-off" lotteries may be implemented as an artfully decorated piece of cardboard or other material with game characters or indicia concealed by a covering material such as latex. In one embodiment, the player simply scratches off the covering material to reveal whether or not the ticket is a winner. An alternate embodiment requires the player to scratch off and reveal a subset of the indicia on the ticket, and the player may or may not win based on the revealed indicia. For example, the scratch-off ticket may include six covered indicia, and the player must uncover three matching indicia, such as three "$20 WIN" spots, in order to win the twenty-dollar prize on the ticket. If one or more selected indicia does not match the other indicia, the player loses the instant win game. It will be understood that the "scratch-off" game may be implement on a video terminal by presenting a variety of indicia hidden behind selectable images. A video scratch-off game would require a player to select an image in an attempt to match indicia hidden there under.

Figure 5:
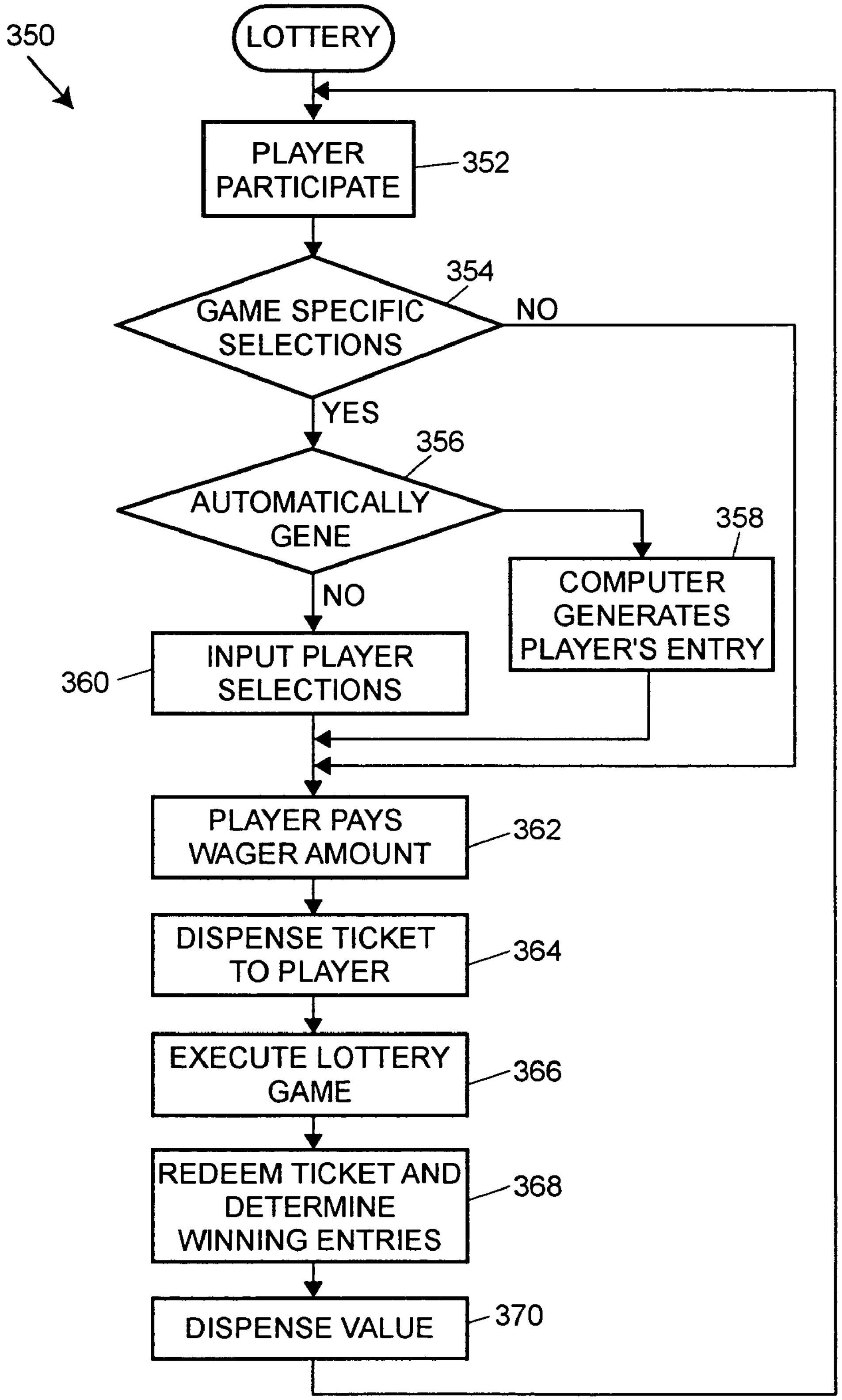
FIG. 5 is a flowchart of an embodiment of a lottery routine in which a player may participate.

FIG. 5 is a flowchart outlining a sample process flow of a lottery game 350 in which a player may participate. For the purpose of this example, and in order to describe various known lottery games, the routine is illustrated and described to implement and allow the player to participate in one of a plurality of lottery games. However, it will be understood by those skilled in the art that the routine may apply where any number of games is offered by the lottery system 100. Referring to FIG. 5, the manual lottery routine may begin at block 352 with a player deciding to participate in a lottery game. Based on the lottery game selected, the lottery game may require game-specific selections by the player when the player wagers or otherwise buys into the lottery game. If no game-specific selections are required at block 354, such as when purchasing an instant lottery and/or scratch-off ticket, the selection process is bypassed. If game-specific selections are required at block 354, a variety of game specific selections such as type of game to play, numbers or other game indicia to play in the game entry, the amount to wager, and number of times or drawings to play may be entered for the player. At block 356, the player may have the option to have the lottery system 100 automatically and randomly generate for the game characters or indicia to be played. If the player elects to automatically generate a ticket, control may pass to block 358 wherein one of the processors 140 or 204 may randomly generate a portion or all of the indicia for the player's entry. If the player elects to select characters or indicia to be used in the lottery game, either on a lottery play slip 300 or by input at the lottery terminal unit 104, they may do so at block 360.

Regardless of the manner in which the selections are made, upon completion of the selection process the player may pay the necessary wager amount at block 362 and the ticket may be dispensed as indicated at block 364. While shown and described as occurring in sequence with the player electing to participate, making game specific selections automatically or manually if necessary, paying the wager amount, and having a lottery ticket dispensed, the steps may occur in any order or concurrently as may be necessary or desired to implement a given lottery game or games. For example, the lottery terminal unit 104 may be configured to require a player to deposit money in a coin slot, currency reader, credit card reader or other value-deposit mechanism, before selecting a game and/or game-specific selections. Alternatively, sales agents may take all the information for the player's entry for the lottery game, print the corresponding lottery ticket and hand the ticket to the player before receiving the wager amount from the player. Those skilled in the art will understand that the steps of selecting a game, making game-specific selections, paying a wager amount and dispensing a lottery ticket may occur in any necessary sequence to accept player entries for the lottery games.

After the players' entries for the lottery game(s) are entered and the players have paid the necessary wager amounts, the lottery games may be executed at block 366. For lottery games involving a drawing, such as Lotto, Powerball-style games, Keno, Bingo, Pick-3 and Pick-4, the drawings may occur on a specified day and time, or at predetermined intervals, with the players being required to make their entries prior to the drawings. For other lottery games initiated by the players, such as instant win games and scratch-off games, the execution of the game occurs when the player performs the necessary actions with the lottery ticket to play the game. For each of these games, however, the execution of the lottery game involves a distinct process for determining the outcome of an occurrence of the game.

In a Lotto game, the players may wager on how many numbers they can match from a specified range of numbers or symbols. For example, during the game-specific selection, the players may select, or have the lottery system 100 select, six numbers from the range of whole numbers from, for example, 1 to 56. At the time of the drawing for the Lotto game, six numbers may be selected from the range of whole numbers from 1 to 56. The six numbers may be selected mechanically using a blower-type ball drawing machine containing a fifty-six balls, each having a number between 1 and 56 printed thereon, electronically using a random number generator or other random selection mechanism at, for example, the lottery host computer 134, or by any other mechanism for randomly selecting a subset of elements from a known set of elements. Winning player entries may be evaluated by comparing the players' selections to the drawing selections to determine the level of correspondence between the players' selections and the drawing selections. The greater the correspondence, the greater the prize may be, up to the awarding of a jackpot where a player's selections exactly match the drawing selections.

Powerball-style games may be similar to Lotto games, with players selecting a subset of a known range of numbers or symbols from multiple ranges of numbers or symbols. In one example of a Powerball-style game, players' entries consist of five numbers selected from the range of 1 to 53, and one number selected from the range of 1 to 42. When the drawing occurs, five numbers are selected from the range of 1 to 53, and one number is selected from the range of 1 to 42. As with Lotto games, the players' entries may also be evaluated by comparing the players' selections with the drawn selections, with prizes being awarded based on the level of correspondence. Matching some or all of the five numbers from the range of 1 to 53 and not matching the one number from the range of 1 to 42, or matching the one number from the range 1 to 42 and none or up to four of the numbers from the range of 1 to 53 may result in winning a fixed prize amount, while matching all five numbers from the first range and the one number from the second range may result in winning a jackpot.

Keno games are well known for both lottery games and casino games. In typical Keno games, players select one to ten or one to fifteen numbers from the range of 1 to 80. At the time of the drawing, twenty numbers are selected from the range of numbers from 1 to 80. Players win based on the level of correspondence, or lack thereof, between the selected numbers and the drawn numbers, with the win amount for any player entry being determined based on the level of correspondence and the amount of numbers selected by the player. For example, a player may be awarded a larger prize for selecting five numbers and matching all five numbers, than for selecting ten numbers and matching five of those numbers.

Bingo is another common lottery and casino game. In Bingo, each player selects one or more game card consisting of a five-by-five matrix of numbers from the range of 1 to 75. The first column contains five numbers selected from the range of 1 to 15, the second column contains five numbers selected from the range of 16 to 30, the third column typically contains four numbers selected from the range of 31 to 45 and a square entitled "FREE SPACE" in the center, the fourth column contains five numbers selected from the range of 46 to 60, and the fifth column contains five numbers selected from the range of 61 to 75. At the time of the drawing, numbers from the range of 1 to 75 are drawn randomly until at least one player matches a predetermined winning pattern, such as matching all the numbers in a row, column or diagonal, matching the four corners of the Bingo card, or matching any other pattern designated as a winning pattern. The player or players matching a winning pattern first are awarded a prize for the game. Larger prizes may also be awarded for matching particular patterns, or for matching the winning pattern within a predetermined number of drawn balls.

Pick-3 and Pick-4 games are somewhat similar to Powerball-style and Lotto games, wherein players select numbers or symbols from a predetermined range of numbers or symbols. In a Pick-3 game, players select a three-digit number (from 000 to 999) for their entry. At the time of making an entry, the player may be able to elect whether the three digit number must match the drawn three digit number exactly (straight bet) or whether the selected digits may appear in any order in the drawn three digit number (box bet). For example, if a player plays "123" in the Pick-3 as a straight bet, the player may only wins if the number "123" is drawn, while a player playing "123" as a box bet may win if "123," "132," "213," "231," "312" or "321" are drawn. In order to allow for the increased probability of winning a box bet, the player may either be required to wager a larger amount to box the bet, or be awarded a smaller prize amount due to the increased probability of having a winning entry. At the time of the drawing, three numbers are each drawn randomly from a separate set of numbers in the range of 0 to 9 such that digits may be repeated in the drawn three-digit number. In one implementation, three separate blower-type ball machines are used to conduct the drawing, with each machine containing ten balls each having a number between 0 and 9 printed thereon. The first-drawn ball is the first digit of the winning number, the second-drawn ball is the second digit of the winning number, and the third-drawn ball is the final digit. Pick-4 games are conducted in a similar manner using four digit numbers.

As previously mentioned, scratch-off lotteries do not involve a separate drawing conducted by the lottery. Instead, the lottery ticket includes indicia for conducting and determining the outcome of the scratch-off game, with the indicia being covered by a material that may be scratched off to expose the indicia disposed there under. For other games, such as pull tab games, the game indicia and/or the entire ticket may be covered by a covering sheet or substrate, with all or portions thereof being removable to expose the game indicia when the game is played by the player. The scratch-off or pull tab games may configured so that each ticket is predetermined to be a winning or losing entry for the game, or configured so that the each ticket may be either a winning or losing entry, with the outcome being determined based on the order or manner in which the player exposes the covered game indicia on the lottery ticket. In the former type of scratch-off or pull tab game, the indicia is configured to indicate whether the ticket is winning or losing entry, and the player merely removes the covering to expose the indicia and evaluates the indicia to determine whether the ticket is a winning or losing ticket. Any player purchasing the ticket will achieve the same outcome.

In the latter type of scratch-off or pull tab game, the player typically removes the covering from a subset of the indicia disposed on the lottery ticket, and the player wins if the player selected a predetermined winning subset of the indicia. For example, the indicia on the lottery ticket may represent different dollar amounts that may be awarded for winning numbers with three of the dollar amounts being the same, and the three remaining dollar amounts being different. To play the game, the player may select and remove the covering from three of the dollar amounts. If the player exposes the three matching dollar amounts, the player wins the corresponding prize amount. If the player exposes one or more of the non-matching dollar amounts, the player does not win a prize for that lottery ticket. Consequently, each ticket may potentially be a winning ticket, but the ticket will only be a winning ticket if the player selects and uncovers the winning combination of indicia.

Upon completion of the lottery game, the lottery tickets may be redeemed by the players and the winning entries may be determined at block 368. For the lottery games for which a drawing is conducted with the outcome of the drawing being compared to each of the player's entries to determine whether the entries are winning entries, the results of the drawing may be entered and recorded in the lottery system 100 at the lottery host computer 134, for example. In implementations where the player entries are stored in databases at the lottery host computer 134 and/or the lottery terminal units 104, the player entries for the occurrence of the lottery game may be compared to the outcome of the lottery drawing to determine which player entries are winning entries. Based on the results of the comparison, the lottery system 100 may generate a listing of winning entries for the occurrence of the lottery game.

When a player presents a lottery ticket at a sales agent location for redemption, the lottery ticket may be inserted in the ticket reader 132 of the lottery terminal unit 104. The lottery terminal unit 104 may use the information encoded on the lottery ticket to retrieve information from the lottery system 100 to determine whether the lottery ticket is a winning ticket. Alternatively, where the player's selections are encoded on the lottery ticket, the lottery terminal unit 104 or central host computer 134 may compare the player's selections to the drawing outcome to determine whether the lottery ticket is a winning ticket; and determine the corresponding award amount. Still further, the lottery ticket, and in particular a scratch-off and pull tab tickets or Bingo card, may be evaluated by a sales agent to determine whether the lottery ticket is a winning ticket, and any corresponding prize award.

Once the prize award for the lottery ticket is determined, the value may be dispensed to the player corresponding to the prize amount determined for a winning lottery ticket at block 370. The dispensed value may be in any appropriate form, including direct cash payments by the sales agent to the players, printing and issuance of a credit voucher or check at the lottery terminal unit 104, applying credit to a debit card, credit card, smart card, player's lottery or bank account, or any other mechanism for dispensing value to the player.

Figure 6:
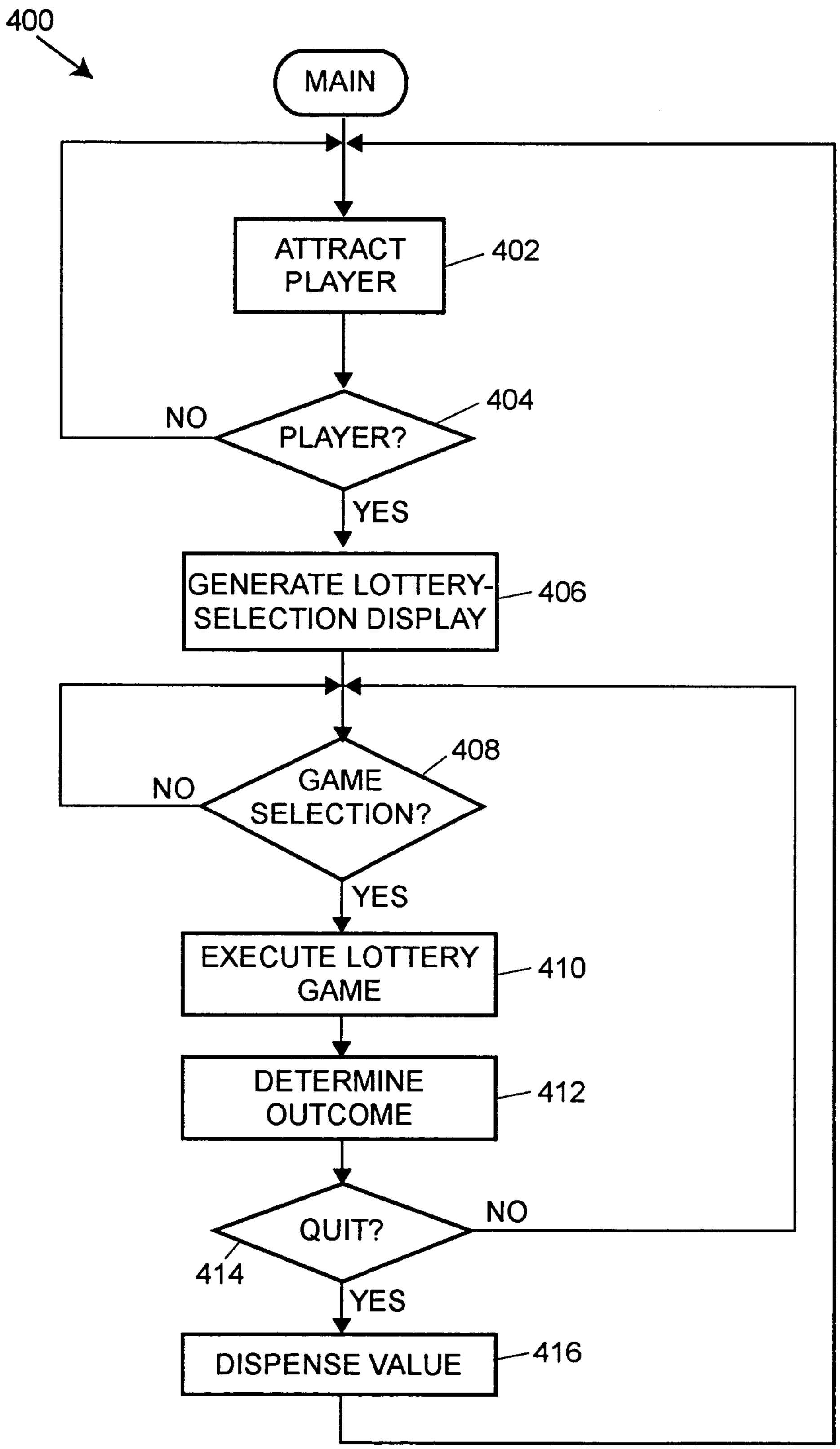
FIG. 6 is a flowchart of an embodiment of a main routine that may be performed during operation of one or more of the lottery terminal units of FIG. 1.

FIG. 6 is a flowchart of an alternative embodiment of an automated main operating routine 400 that may be stored in the memory 202 of the controller 200 of the lottery terminal unit 104 that may be adapted to allow the player to play interactive lottery games, such as video poker, video Keno, video blackjack, video Bingo and the like. The main routine 400 may begin operation at block 402 during which an attraction sequence may be performed in an attempt to induce a potential player to play the lottery terminal unit 104, 116. The attraction sequence 402 may be performed by displaying one or more video images on the display 128 and/or causing one or more sound segments, such as voice or music, to be generated via the speakers 216. The attraction sequence 402 may include a scrolling list of video lottery games that may be played on the lottery terminal unit 104, 116 and/or images of various lottery games being played, such as video poker, video Keno, video blackjack and the like.

During performance of the attraction sequence, if a potential player makes any input to the gaming unit 104 as determined at block 404, the attraction sequence may be terminated and a game-selection display may be generated on the display 128 at block 406 to allow the player to select a lottery available on the lottery terminal unit 104. The lottery terminal unit 104 may detect an input at block 404 in various ways. For example, the lottery terminal unit 104 could detect if the player presses any button on the control panel 124, could determine whether the player deposited currency into a coin slot or currency reader, inserted a smart card into the card reader 130, or recognized any other input of value by the player.

The game-selection display generated at block 406 may include, for example, a list of video lottery games that may be played on the lottery terminal unit 104 and/or a visual message to prompt the player to deposit value into the lottery terminal unit 104. While the game-selection display is generated, the lottery terminal unit 104 may wait for the player to make a game selection. At block 408, if no game selection is made within a given period of time, the operation may branch back to block 402. Upon selection of one of the games by the player as determined at block 408, the controller 200 may execute one of a number of lottery game routines at block 410 to allow player to play the selected lottery game. The lottery game routine executes and allows the player to play the selected lottery game. For example, when playing video poker, the player may be allowed to indicate whether to hold or drop cards dealt by the lottery terminal unit 104 to the player. In video Keno, the player may select up to ten or fifteen numbers from 1 to 80 to use as the player's game entry. In video blackjack, the player may indicate whether to hit or stand on a hand, or split or double down on a hand. At the end of the game, the outcome may be determined at block 412. The lottery terminal unit 104 may determine the amount of any prize won by the player and corresponding to the player's wager on the game, and increment the amount of credits for the player on the lottery terminal unit 104.

At this point, the player may elect to quit the game and cash out the player's credits at block 414. If the player wishes to stop playing the lottery terminal unit 104 and "Cash Out" any accumulated credits, the controller 200 may dispense value to the player at block 416 based on the outcome of the game(s) played by the player. The operation may then return to block 402. If the player does not wish to quit as determined at block 414, the routine may return to block 406 where the game-selection display may again be generated to allow the player to select another game.

Multi-Theme Instant Win Lottery Game

Lottery games for which a lottery ticket is printed and dispensed at the lottery terminal unit 104 may be enhanced or supplemented by providing players with the opportunity to participate in an instant win game along with the lottery game. An instant win game may implemented in a lottery system 100 as described herein wherein the central host computer 134 may be programmed with software for executing the various lottery games offered by a lottery commission, and one or more remote lottery terminal units 104, 116 are programmed to receive the game selections of the lottery players as input. The instant win game may be an additional lottery game wherein multiple themes are available for displaying the outcome of the lottery game while using the same logic for determining the outcome of the lottery game. The various themes may be coded into the software for the lottery game so that the themes may be alternated or cycled without the need to download additional code or reprogram the game logic in order to display a different game theme. The themes may be displayed at a monitor or other display device, such as display 128 at a lottery terminal unit 104 executing routine 400 to play video lottery games, or printed on the lottery ticket in addition to the information printed for the base lottery game with which the instant win game may be associated. Alternatively, the instant win game may be offered as a stand-alone game.

Figure 7:
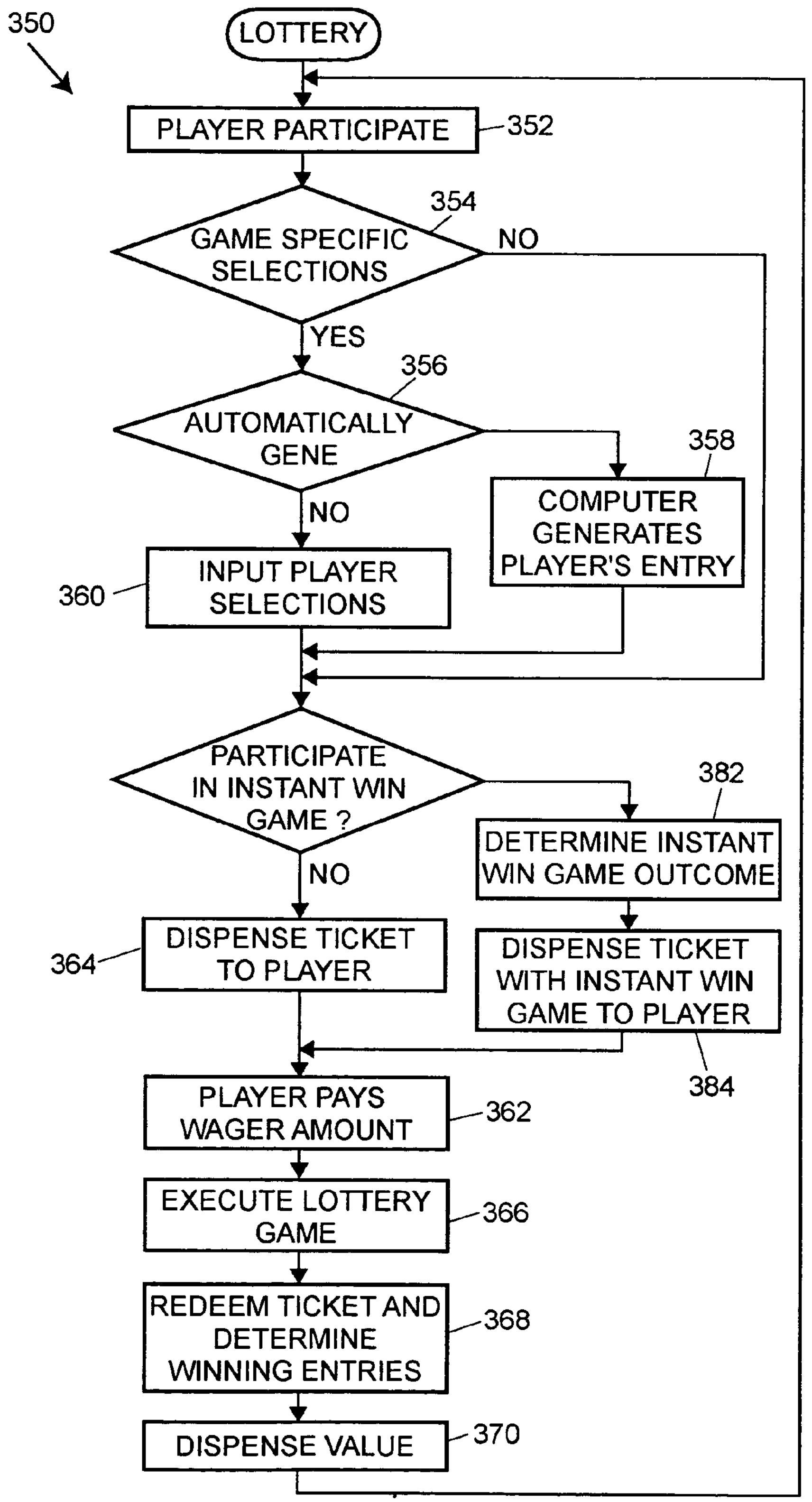
FIG. 7 is a flowchart of an embodiment of a lottery routine including an instant win game.

An example of a routine wherein an instant win game may be implemented along with a base lottery game is illustrated in FIG. 7, in which routine 350 of FIG. 5 has been modified to include the instant win game, and wherein the same reference numerals are used to refer to similar steps in the process. As with the normal lottery games, the player elects to participate in a particular lottery game at block 352 and, if necessary, game-specific player selections (block 354) are entered either automatically (at blocks 356 and 358) or by the player's choice (at block 360). Once any necessary game-specific player selections are entered, the player may be presented with the option of participating in the instant win game at block 372.

Depending on the manner in which the player's information is being input to enter into the lottery game, the prompting of the player to elect whether to participate in the game may be in any appropriate form. For example, if the player is entering information at one of the lottery terminal units 104, a prompt may be shown at the display 128 asking the player whether the player wants to participate in the instant win game, and indicating particular keys or portions of the display 128 to touch in order to indicate a desire to participate in the instant win game. If the player's information is being taken by a sales agent at the lottery terminal unit 104, a prompt may cause the sales agent to ask the player whether the player wants to participate in the instant win game. Further, the play slip for the lottery game may be modified to include a box or area to be marked if the player wants to play an instant win game.

Figure 8:
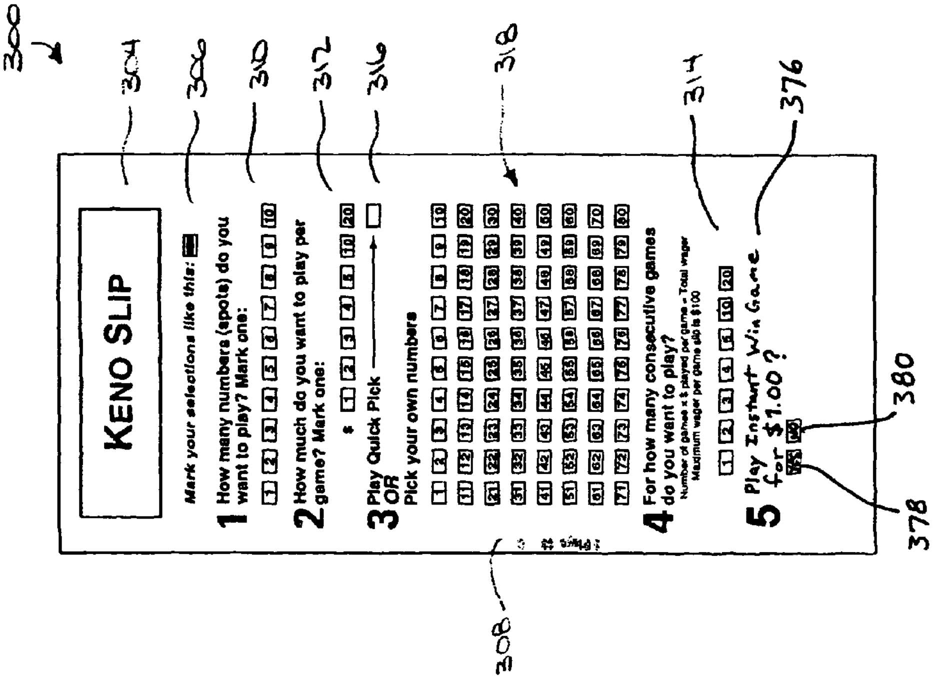
FIG. 8 illustrates an alternative embodiment of a lottery play slip offering an instant win game that may be read by the lottery terminal unit of FIG. 2.

One example of a Keno play slip 374 including information allowing the player to play an instant win game is shown in FIG. 8, which is similar to the play slip 300 of FIG. 3, and wherein the same reference numerals are used to refer to similar information on the play slip 374. The play slip 374 may include indicia 376 asking the player to indicate whether the player wants to play the instant win game for an additional wager. If the player wants to play the instant win game, the player may mark a YES box 378, and mark a NO box 380 if the player does not want to play the instant win game. Alternatively, the play slip 300 may provide only a single boxed to be marked if the player elects to play the instant win game. When the play slip 374 is scanned by the play slip/ticket reader 132, the lottery terminal unit 104 interprets any marks in the YES box 378 and NO box 380, or absence of markings in either box 378 or 380, and enters or does not enter the player in the instant win game based on any markings made by the player. Similarly, any other means by which the player's information is input will determine whether the player is entering the instant win game based on the input information. Alternatively, the player may be eligible to participate in an instant win game solely by playing the associated base lottery game, or meeting some minimum betting requirements for the base lottery game.

Returning to FIG. 7, if the player does not elect to participate in the instant win game or otherwise does not qualify to participate in the instant win game, control passes to block 364 wherein a lottery ticket may be printed and dispensed to the player in the manner previously described. If the player elects to participate in the instant win game, control may pass to a block 382 wherein the lottery system 100 may determine the outcome of the instant win game for the player. The outcome of an occurrence of the instant win game for the player may be determined remotely at the lottery terminal unit 104 or centrally at a lottery server 106 or central host computer 134, or cooperatively by the lottery terminal unit 104, the lottery server 106 and/or the central host computer 134. For example, the central host computer 134 may determine the outcomes for all the occurrences of the instant win game within the lottery system 100. When a lottery terminal unit 104 receives a request from a player to play the instant win game, the lottery terminal unit 104 may transmit a request to the central host computer 134 for an outcome of the instant win game. When the central host computer 134 receives the request from the lottery terminal unit 104, the central host computer 134 may execute software stored in memory 138 to determine an outcome for the instant win game. The outcome for the occurrence of the instant win game may be determined using any known algorithms and/or routines for determining game outcomes, such as using random number generators, randomly selecting one of a plurality of available game outcomes, and the like. Those skilled in the art will understand that any method for determining the outcome of the instant win game may have use with the method and apparatus according to the present invention. Once the central host computer 134 determines the outcome of the occurrence of the instant win game, the central host computer 134 transmits the outcome to the lottery terminal unit 104. The central host computer 134 may also store outcome and associated information in the memory 138, database 154 or other storage location used to track the results for the instant win game, or the outcome and associated information may be stored at the originating lottery terminal unit 104 in memory 202, for example.

Alternatively, in a decentralized system, each lottery terminal unit 104 may be programmed with software for determining outcomes of occurrences of the instant win game. As discussed above, the lottery terminal unit 104 may be programmed with any appropriate algorithm and/or routine for determining an outcome of the instant win game. Further, the outcomes may be stored at the lottery terminal unit 104 or transmitted to the central host computer 134 for storage. Moreover, the process of determining the outcome of an occurrence of the instant win game may be divided between components of the system as may be necessary to achieved regulatory, system, processing and design requirements and preferences.

Once the outcome for the occurrence of the instant win game is determined, the lottery terminal unit 104 may print and dispense the lottery ticket to the player at block 384. The outcome of the instant win game may be printed on the lottery ticket using one of a plurality of available game themes. For example, after the Keno play slip 374 of FIG. 8 is scanned by the reader 132, and the outcome for the occurrence of the instant win game is determined by the lottery system 100, the ticket printer 133 may print a lottery ticket, such as Keno lottery ticket 386 illustrated in FIG. 9, which is similar to Keno lottery ticket 302 of FIG. 4, and wherein corresponding elements are identified by the same reference numerals. The lottery ticket 386 may print with the same indicia 320-334, and may include indicia 388 corresponding to the outcome of the instant win game. In this example, the outcome of the instant win game is displayed with a football theme, a scoring summary for a football game. The indicia 388 shows that the player's team with a total of 31 points, and the opponent team with a total score of 30 points. As indicated by the indicia 388, because the player's team outscored the opponent's team, the player has won $5.00 on the instant win game. If the outcome of instant win game was a losing outcome, the outcome may have been printed on the lottery ticket 386 with indicia 388 wherein the opponent's team scored more total points than the player's team.

Figure 9:
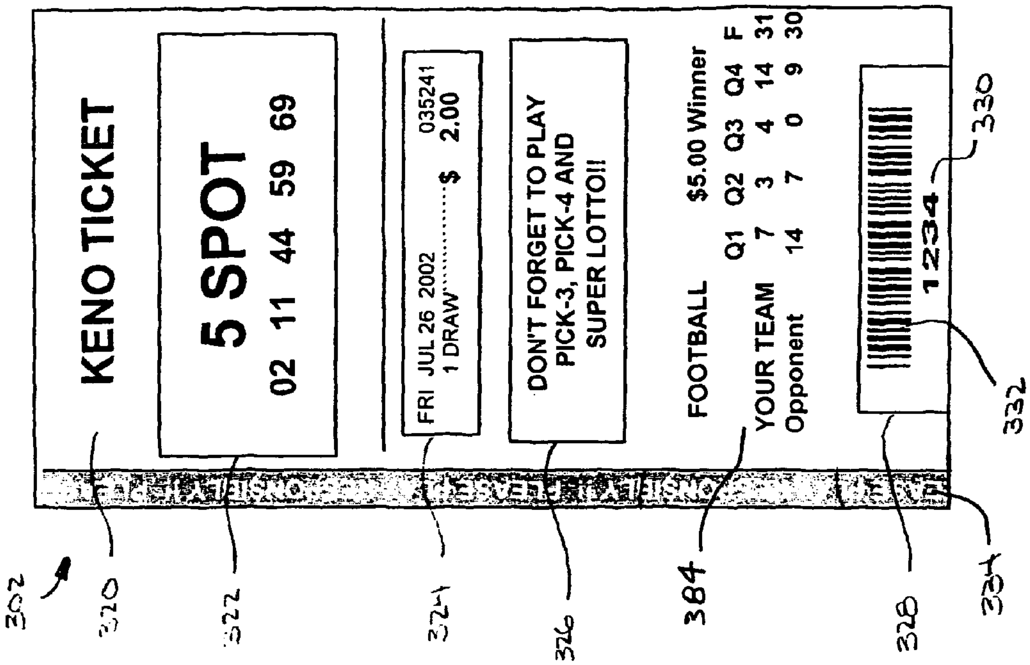
FIG. 9 illustrates an alternative embodiment of a lottery ticket including an instant win game that may be generated by the lottery terminal unit of FIG. 2.

As previously discussed, a plurality of game themes may be available for lottery terminal unit 104 to print the outcome of the instant win game on the lottery ticket. The particular game theme used to display the outcome of the instant win game may be dictated to the lottery terminal unit 104 by a game theme indicator that may be a code corresponding to one of the available game themes. The game theme indicator may be preset so that the same theme is printed for the instant win game each time the instant win game is played until the game theme indicator is changed to cause the instant win game outcome to print with a different one of the stored game themes. For example, one value of the game theme indicator may cause the lottery ticket to print with a football theme for the instant game as shown in FIG. 9.

Figure 11:
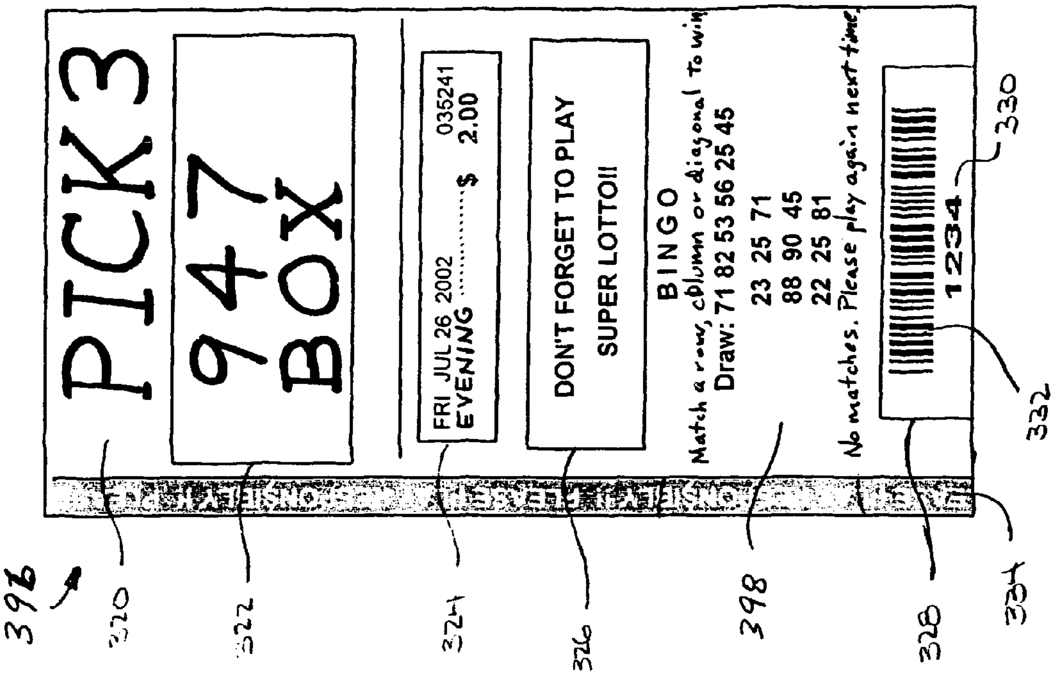
FIG. 11 illustrates a further alternative embodiment of a lottery ticket including an instant win game that may be generated by the lottery terminal unit of FIG. 2.
Figure 10:
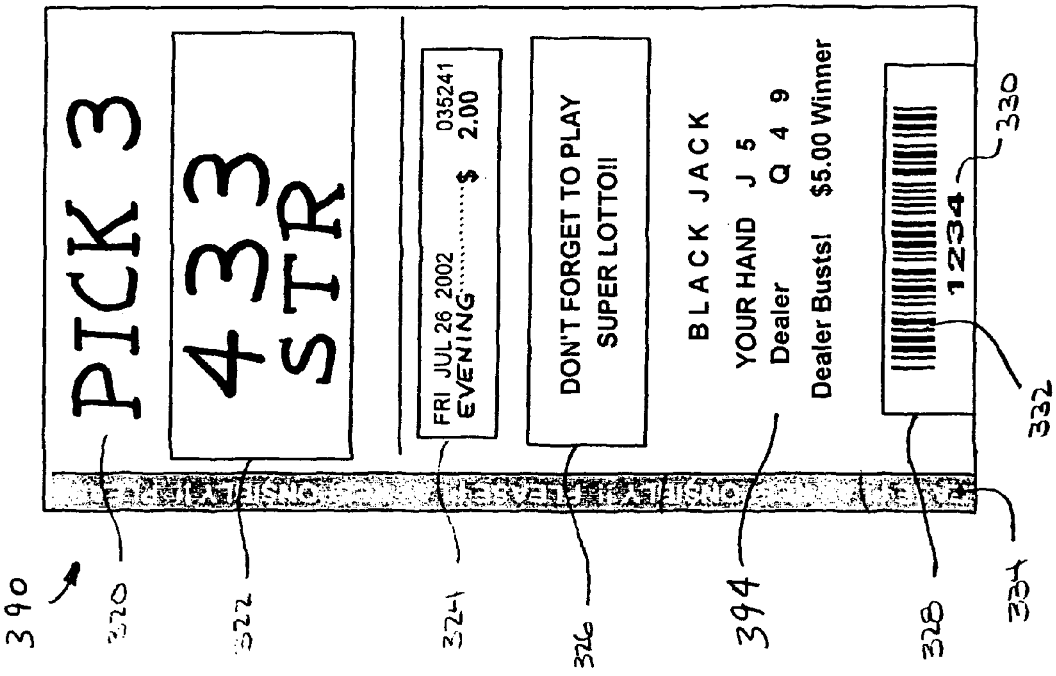
FIG. 10 illustrates another alternative embodiment of a lottery ticket including an instant win game that may be generated by the lottery terminal unit of FIG. 2.

A different game theme indicator may correspond to a blackjack theme, and may cause lottery terminal units 104 to print Pick-3 lottery tickets, such as lottery ticket 390 of FIG. 10, having indicia 320-334 as previously described and corresponding to the player's Pick-3 entry, and indicia 394 corresponding to the outcome of the instant win game displayed with a blackjack theme. In this example, the indicia 394 indicates that the player won the instant win game because the player's hand totals 15 and the dealer's hand totals 23, meaning that the dealer busted and the player wins. As a further alternative, the game theme indicator may cause the lottery ticket to print with a Bingo theme for the instant win game as shown for lottery ticket 396 of FIG. 11, having indicia 320-334 as previously described and corresponding to the player's Pick-3 entry, and indicia 398 corresponding to the outcome of the instant win game displayed with the Bingo theme. In the sample Bingo game, the player had the opportunity to win $20.00 and lost, with the losing outcome being displayed as a Bingo game in which the player did not match a row, column or diagonal.

Depending on the implementation, the game theme indicator may reside in different locations within the lottery system 100. Where control of the lottery system 100 is centralized at the central host computer 134, the game theme indicator may be stored in the memory 138 or database 154. The central host computer 134 may also include an application allowing an operator to change the stored game theme indicator via input at, for example, one of the peripheral I/O devices 152 when it is desired to change the theme used with the instant win game. If the outcomes for occurrences of the instant win game are determined at the central host computer 134, the game theme indicator may be transmitted to the lottery terminal units 104 when the outcome of the occurrence of the instant win game is transmitted to the lottery terminal units 104. Alternatively, the game theme indicator may be transmitted to the lottery terminal units 104 and stored at the units 104 whenever the game theme indicator is changed at the central host computer 134. Still further, the lottery terminal units 104 may include applications allowing a game theme indicator stored therein to be updated at the lottery terminal units 104. It will be apparent that, depending on the implementation, the instant win game may use the same game theme indicator and display the same game theme on lottery tickets printed at all lottery terminal units 104, or may use different game theme indicators at different lottery terminal units 104 and, consequently, display different game themes on lottery tickets printed at different lottery terminal units 104.

For each game theme that may be used to display the outcome of the instant win game, the outcomes of the game associated with the game theme may be mapped to the potential outcomes of the instant win game. For example, blackjack theme game outcomes may map to the instant win game outcomes as shown in Table 1.

TABLE 1

| Instant Win Game Outcome | Prize Amount | Player's Hand | Dealer's Hand |
|---|---|---|---|
| Win | $1.00 | A 9 | Q 8 |
| Lose | $1.00 | 9 8 | K Q |
| Win | $2.00 | 8 3 9 | K 7 |
| Lose | $2.00 | Q 4 K | 8 A |
| Win | $5.00 | J 5 | Q 4 9 |
| Lose | $5.00 | Q 7 | 9 A |
| Win | $20.00 | A Q | K J |
| Lose | $20.00 | K J | 6 8 7 |

In the example, eight potential outcomes are defined for the instant win game corresponding to a win and a lose outcome for $1.00, $2.00, $5.00 and $20.00 prize amounts. Each outcome may have an associated probability of occurring that may be calculated to achieve a desired or required return or payout to the players wagering on the instant win game. Each of the potential instant game outcomes may be mapped to one blackjack outcome such that each time a given instant win game outcome occurs, the same blackjack hands will be printed on the lottery ticket. For example, each time the $5.00 WIN outcome occurs for the instant win game, the blackjack outcome printed on the lottery ticket will look similar to the indicia 394 of the lottery ticket 390 of FIG. 10. While this example illustrates a one-to-one correspondence between the instant win game outcomes and the game theme outcomes, it will be understood that a given instant win game outcome may be mapped to more than one game theme outcome. Where more than one game theme outcome may be mapped to a given instant win game outcome, a particular one of the game theme outcomes may be selected randomly, serially or by any other method such that the printed game theme outcome for the instant win game outcome may vary each time the instant win game outcome occurs.

After the lottery ticket is dispensed, the flow of the routine proceeds similar to the flow of routine 350 of FIG. 5. The player may pay the wager amount at block 362, and the base lottery game executes at block 366. After the base lottery game is executed, the players redeem the lottery tickets and the lottery system 100 evaluates the players' entries as previously discussed at block 368. In addition to evaluating the outcome of the base lottery game, the outcome of the instant win game may be evaluated. Similar to the outcome for the base lottery game, the outcome of the instant win game for each lottery ticket may be stored within the lottery system 100 at the central host computer 134 or the lottery terminal units 104 and retrieved when the lottery ticket is scanned, or the outcome of the instant win game may be encoded on the lottery ticket and evaluated by the lottery terminal unit 104 when the lottery ticket is scanned. Once the outcome of the lottery ticket is evaluated and the any prize amount is determined, including any instant win game prize amount, value may be dispensed to the player at block 370 in any appropriate manner as previously discussed.

In a similar manner, an instant win game with multiple themes may be implemented in a video lottery system, with the routine 400 of FIG. 6 being revised in a similar manner as discussed above. During the course of playing a video lottery game at lottery terminal unit 104, the player may be provided with the opportunity to play an instant win game by placing an additional wager or otherwise qualifying to play the instant win game. When a player plays the instant win game, the outcome of the instant win game may be determined at the lottery terminal unit 104 or the central host computer 134, with the outcome of the instant win game being printed on a voucher or receipt produced by the lottery terminal unit 104, or displayed for the player on a portion of the display 128 of the lottery terminal unit 104 as the player plays the base video lottery game. Moreover, the instant win game may be displayed to the user in print or video form with one of a plurality of available themes, such as blackjack, poker, Bingo, football and the like. The particular instant win game theme may be dictated by a game theme indicator either provided by the central host computer 134 or stored at the lottery terminal unit 104. When the player cashes out from the lottery terminal unit 104, the value dispensed may include any credits or awards obtained from the instant win game.

It will be apparent that multiple game themes may be used to display the instant win game outcomes produced by the instant win game software without altering the instant win game software. Outcomes of each of the available game themes are mapped to the outcomes of the instant win game. The only change required to display the instant win game outcomes in the various game themes is updating the game theme indicator to point to the appropriate game theme. Therefore, reprogramming of the lottery system 100 is not required in order to change game theme used to display the outcome of the instant win game. Further, because the software for executing the instant win game is not reprogrammed, it may not be necessary or required to recertify the instant win game when the display of the outcome of the instant win game is switched between the various game themes. Moreover, by using the same underlying instant win game for the plurality of game themes, multiple game theme instant win games may be implemented while only counting as a single lottery game towards any applicable regulatory limit on the number of lottery games that may be offered by a lottery system 100.

Casino Gaming Network

The functionality and components of the lottery system 100 discussed hereinbefore may also have application in casino gaming systems as described in more detail hereinafter. Those skilled in the art will understand that, to the extent not specifically discussed, the functions and components of the lottery system 100 may be implemented as necessary or desired to provide similar functionality and perform similar functions in casino gaming systems. Moreover, those skilled in the art will similarly understand that functionality and components of casino gaming networks as described herein may be implemented in lottery systems, such as the lottery system 100.

Figure 12:
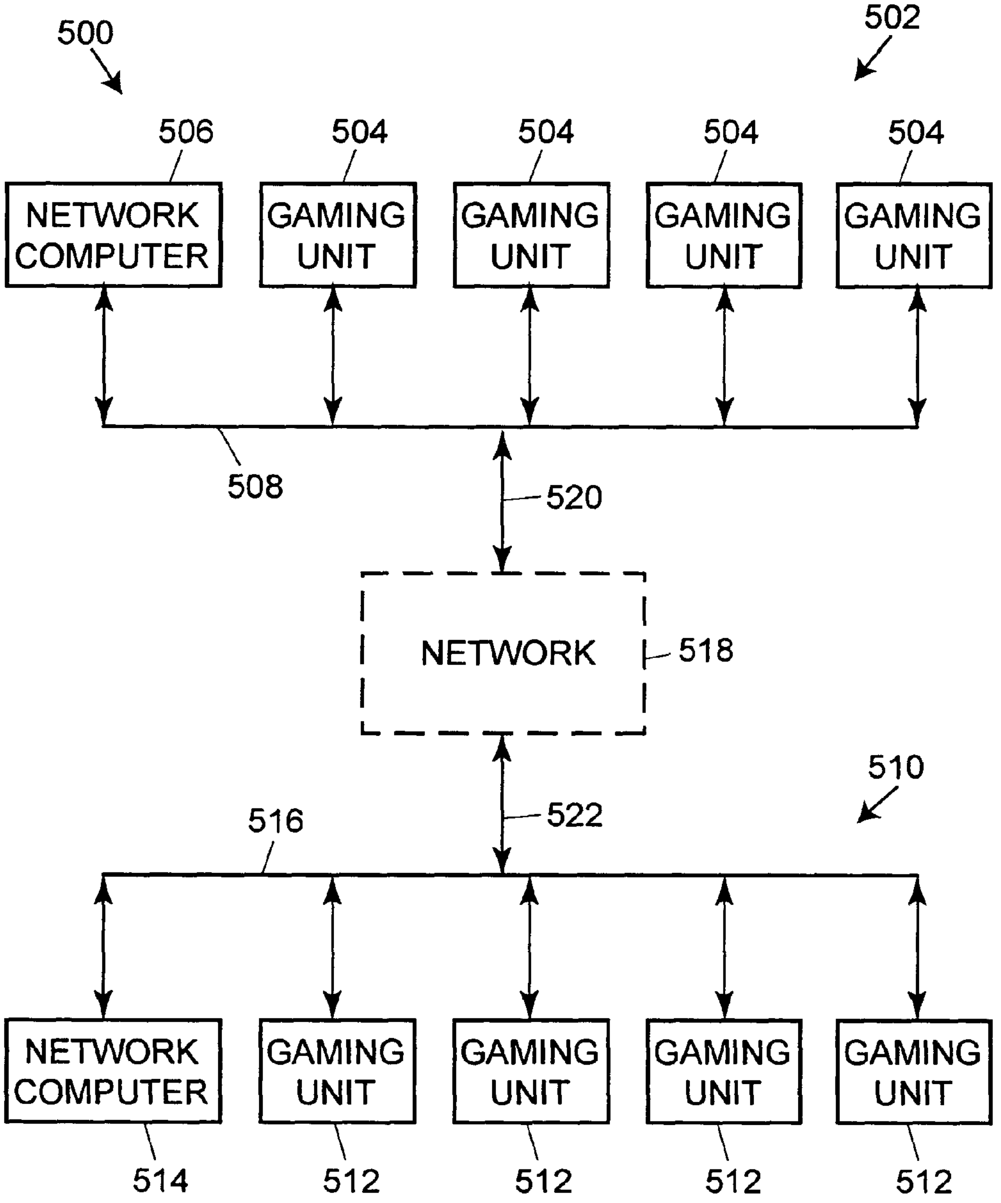
FIG. 12 is a block diagram of an embodiment of a gaming system.

Referring to FIG. 12 illustrates one possible embodiment of a casino gaming system 500 in accordance with the invention. Referring to FIG. 12, the casino gaming system 500 may include a first group or network 502 of casino gaming units 504 operatively coupled to a network computer 506 via a network data link or bus 508. The casino gaming system 500 may include a second group or network 510 of casino gaming units 512 operatively coupled to a network computer 514 via a network data link or bus 516. The first and second gaming networks 502, 510 may be operatively coupled to each other via a network 518, which may comprise, for example, the Internet, a wide area network (WAN), or a local area network (LAN) via a first network link 520 and a second network link 522. The network 518 may further be a wireless network and include a wireless hub or router communicatively connected to the gaming networks 502, 510 using any known communications standard or protocol.

The first network 502 of gaming units 504 may be provided in a first casino, and the second network 510 of gaming units 512 may be provided in a second casino located in a separate geographic location than the first casino. For example, the two casinos may be located in different areas of the same city, or they may be located in different states. The network 518 may include a plurality of network computers or server computers (not shown), each of which may be operatively interconnected. Where the network 518 comprises the Internet, data communication may take place over the communication links 520, 522 via an Internet communication protocol.

The network computer 506 may be a server computer and may be used to accumulate and analyze data relating to the operation of the gaming units 504. For example, the network computer 506 may continuously receive data from each of the gaming units 504 indicative of the dollar amount and number of wagers being made on each of the gaming units 504, data indicative of how much each of the gaming units 504 is paying out in winnings, data regarding the identity and gaming habits of players playing each of the gaming units 504, etc. The network computer 514 may be a server computer and may be used to perform the same or different functions in relation to the gaming units 512 as the network computer 506 described above. The network computers 506, 514 may similar type computers to the host computers or servers 134 of the lottery system 100 described above, and may include analogous components to the controller 136, memory 138, microprocessor 140, RAM 142, I/O bus 144, display 146, control panel 148, network interface 150, peripheral I/O devices 152 and database 154.

Although each network 502, 510 is shown to include one network computer 506, 514 and four gaming units 504, 512, it should be understood that different numbers of computers and gaming units may be utilized. For example, the network 502 may include a plurality of network computers 506 and tens or hundreds of gaming units 504, all of which may be interconnected via the data link 508. The data link 508 may provided as a dedicated hardwired link or a wireless link. Although the data link 508 is shown as a single data link 508, the data link 508 may comprise multiple data links.

Figure 13:
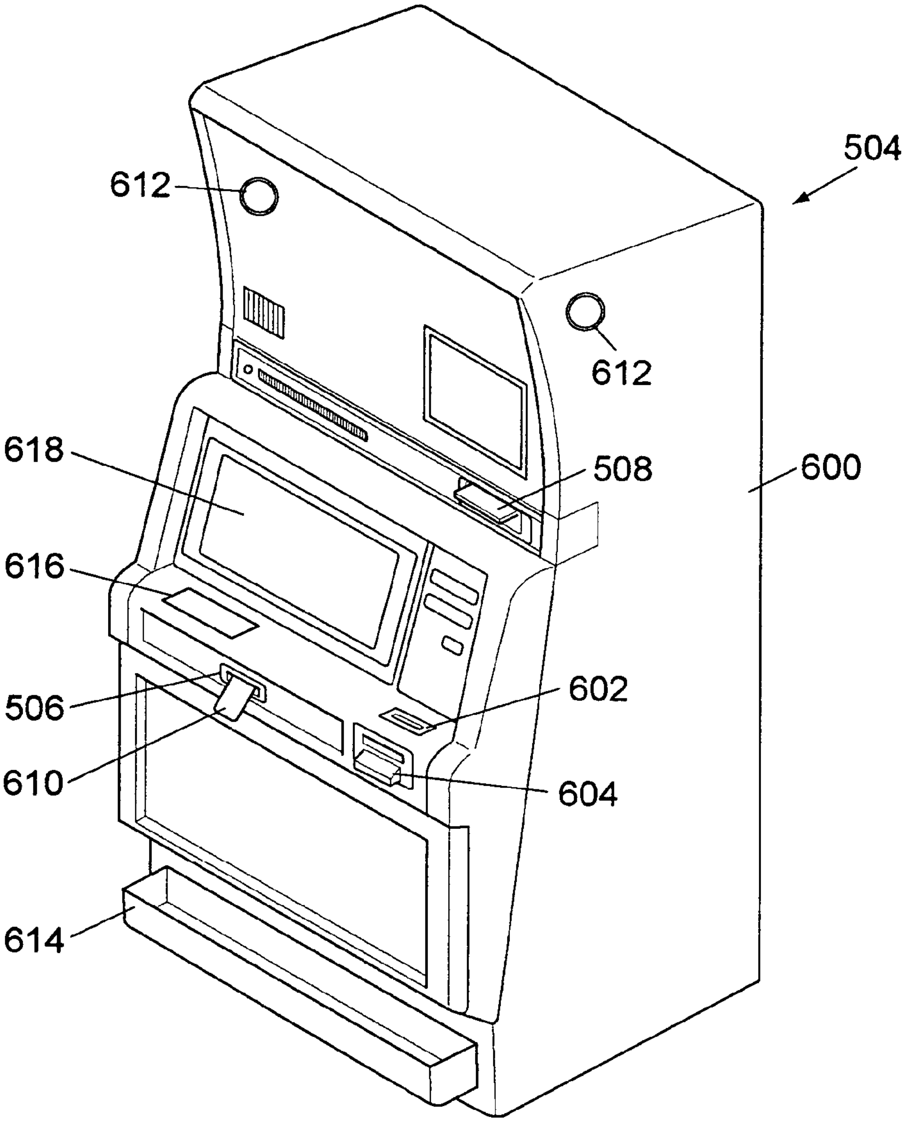
FIG. 13 is a perspective view of an embodiment of one of the gaming units shown schematically in FIG. 12.

FIG. 13 is a perspective view of one possible embodiment of one or more of the gaming units 504. Although the following description addresses the design of the gaming units 504, it should be understood that the gaming units 512 may have the same design as the gaming units 504 described below. It should be understood that the design of one or more of the gaming units 504 may be different from the design of other gaming units 504, and that the design of one or more of the gaming units 512 may be different from the design of other gaming units 512. Each gaming unit 504 may be any type of casino gaming unit and may have various different structures and methods of operation. For exemplary purposes, various designs of the gaming units 504 are described below, but it should be understood that numerous other designs may be utilized.

Referring to FIG. 13, the casino gaming unit 504 may include a housing or cabinet 600 and one or more input devices, which may include a coin slot or acceptor 602, a paper currency acceptor 604, a ticket reader/printer 606 and a card reader 608, which may be used to input value to the gaming unit 504. A value input device may include any device that can accept value from a customer. As used herein, the term “value” may encompass gaming tokens, coins, paper currency, ticket vouchers, credit or debit cards, smart cards, and any other object representative of value.

If provided on the gaming unit 504, the ticket reader/printer 606 may be used to read and/or print or otherwise encode ticket vouchers 610. The ticket vouchers 610 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 610 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 610 could be printed with an optically readable material such as ink, or data on the ticket vouchers 610 could be magnetically encoded. The ticket reader/printer 606 may be provided with the ability to both read and print ticket vouchers 610, or it may be provided with the ability to only read or only print or encode ticket vouchers 610. In the latter case, for example, some of the gaming units 504 may have ticket printers 606 that may be used to print ticket vouchers 610, which could then be used by a player in other gaming units 504 that have ticket readers 606.

If provided, the card reader 608 may include any type of card reading device, such as a magnetic card reader or an optical card reader, and may be used to read data from a card offered by a player, such as a credit card or a player tracking card. If provided for player tracking purposes, the card reader 608 may be used to read data from, and/or write data to, player tracking cards that are capable of storing data representing the identity of a player, the identity of a casino, the player's gaming habits, etc.

The gaming unit 504 may include one or more audio speakers 612, a coin payout tray 614, an input control panel 616, and a color video display unit 618 for displaying images relating to the game or games provided by the gaming unit 504. The audio speakers 612 may generate audio representing sounds such as the noise of spinning slot machine reels, a dealer's voice, music, announcements or any other audio related to a casino game. The input control panel 616 may be provided with a plurality of pushbuttons or touch-sensitive areas that may be pressed by a player to select games, make wagers, make gaming decisions, etc.

Figure 14:
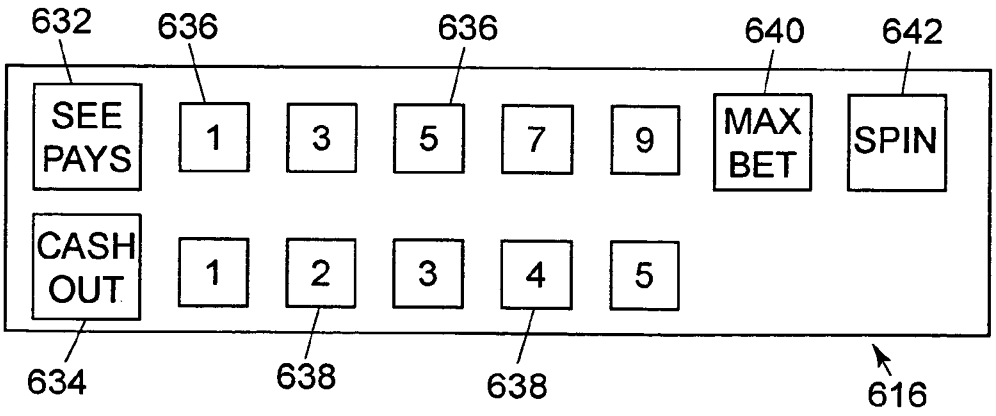
FIG. 14 illustrates an embodiment of a control panel for the gaming unit of FIG. 13.

FIG. 14 illustrates one possible embodiment of the control panel 616, which may be used where the gaming unit 504 is a slot machine having a plurality of mechanical or "virtual" reels. Referring to FIG. 14, the control panel 616 may include a "See Pays" button 632 that, when activated, causes the display unit 618 to generate one or more display screens showing the odds or payout information for the game or games provided by the gaming unit 504. As used herein, the term "button" is intended to encompass any device that allows a player to make an input, such as an input device that must be depressed to make an input selection or a display area that a player may simply touch. The control panel 616 may include a "Cash Out" button 634 that may be activated when a player decides to terminate play on the gaming unit 504, in which case the gaming unit 504 may return value to the player, such as by returning a number of coins to the player via the payout tray 614.

If the gaming unit 504 provides a slots game having a plurality of reels and a plurality of paylines which define winning combinations of reel symbols, the control panel 616 may be provided with a plurality of selection buttons 636, each of which allows the player to select a different number of paylines prior to spinning the reels. For example, five buttons 636 may be provided, each of which may allow a player to select one, three, five, seven or nine paylines.

If the gaming unit 504 provides a slots game having a plurality of reels, the control panel 616 may be provided with a plurality of selection buttons 638 each of which allows a player to specify a wager amount for each payline selected. For example, if the smallest wager accepted by the gaming unit 504 is a quarter ($0.25), the gaming unit 504 may be provided with five selection buttons 638, each of which may allow a player to select one, two, three, four or five quarters to wager for each payline selected. In that case, if a player were to activate the "5" button 636 (meaning that five paylines were to be played on the next spin of the reels) and then activate the "3" button 638 (meaning that three coins per payline were to be wagered), the total wager would be $3.75 (assuming the minimum bet was $0.25).

The control panel 616 may include a "Max Bet" button 640 to allow a player to make the maximum wager allowable for a game. In the above example, where up to nine paylines were provided and up to five quarters could be wagered for each payline selected, the maximum wager would be 45 quarters, or $11.25. The control panel 616 may include a spin button 82 to allow the player to initiate spinning of the reels of a slots game after a wager has been made.

In FIG. 14, a rectangle is shown around the buttons 632, 634, 636, 638, 640, 82. It should be understood that that rectangle simply designates, for ease of reference, an area in which the buttons 632, 634, 636, 638, 640, 82 may be located. Consequently, the term "control panel" should not be construed to imply that a panel or plate separate from the housing 600 of the gaming unit 504 is required, and the term "control panel" may encompass a plurality or grouping of player activatable buttons.

Although one possible control panel 616 is described above, it should be understood that different buttons could be utilized in the control panel 616, and that the particular buttons used may depend on the game or games that could be played on the gaming unit 504. Although the control panel 616 is shown to be separate from the display unit 618, it should be understood that the control panel 616 could be generated by the display unit 618. In that case, each of the buttons of the control panel 616 could be a colored area generated by the display unit 618, and some type of mechanism may be associated with the display unit 618 to detect when each of the buttons was touched, such as a touch-sensitive screen.

Gaming Unit Electronics

Figure 15:
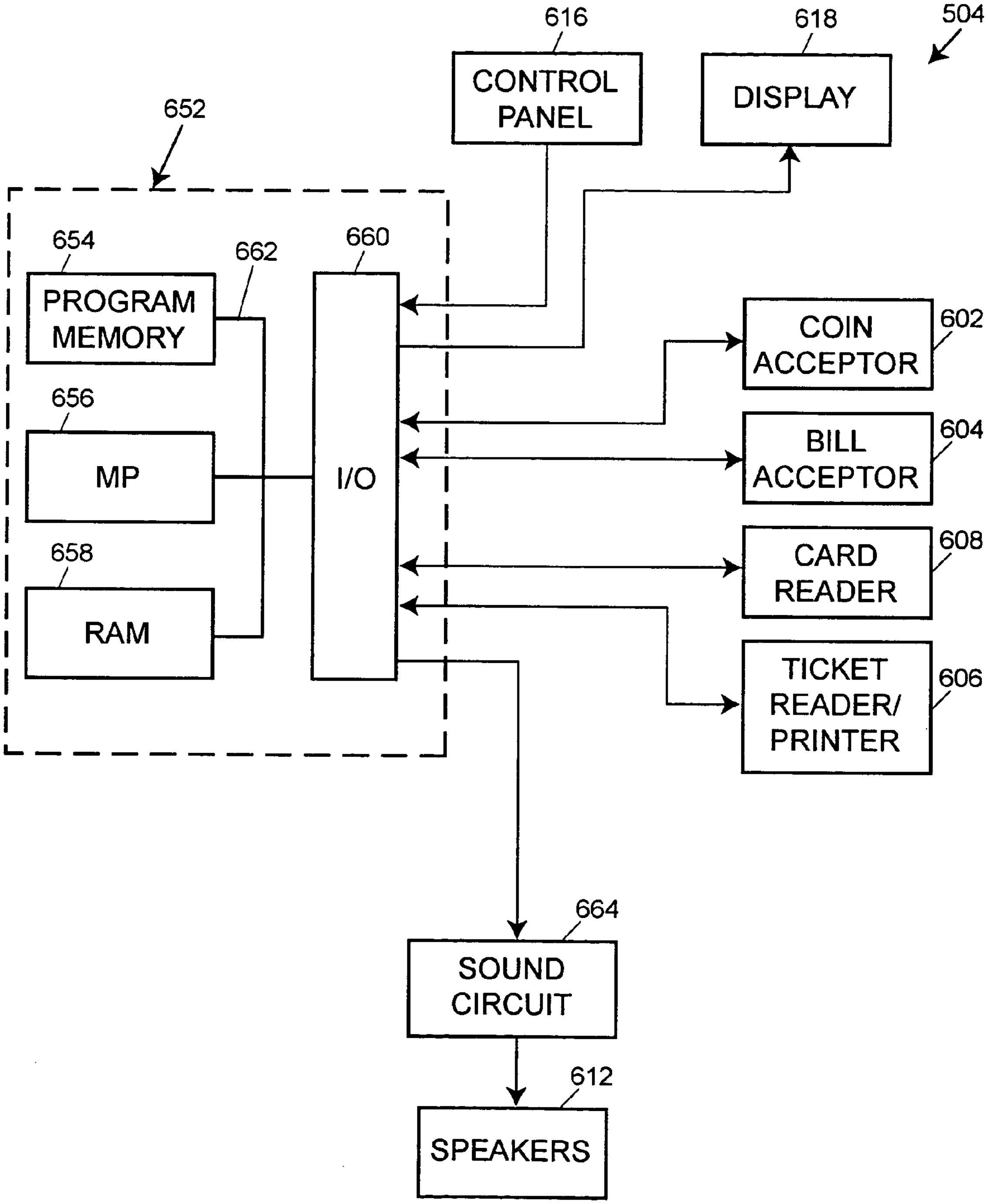
FIG. 15 is a block diagram of the electronic components of the gaming unit of FIG. 13.

FIG. 15 is a block diagram of a number of components that may be incorporated in the gaming unit 504. Referring to FIG. 15, the gaming unit 504 may include a controller 652 that may comprise a program memory 654, a microcontroller or microprocessor (MP) 656, a random-access memory (RAM) 658 and an input/output (I/O) circuit 660, all of which may be communicatively interconnected via an address/data bus 662. It should be appreciated that although only one microprocessor 656 is shown, the controller 652 may include multiple microprocessors 656. Similarly, the memory of the controller 652 may include multiple RAMs 106 and multiple program memories 654. Although the I/O circuit 660 is shown as a single block, it should be appreciated that the I/O circuit 660 may include a number of different types of I/O circuits. The RAM(s) 104 and program memories 654 may be implemented as semiconductor memories, magnetically readable memories, and/or optically readable memories, for example.

Although the program memory 654 is shown in FIG. 15 as a read-only memory (ROM) 654, the program memory of the controller 652 may be a read/write or alterable memory, such as a hard disk. In the event a hard disk is used as a program memory, the address/data bus 662 shown schematically in FIG. 15 may comprise multiple address/data buses, which may be of different types, and there may be an I/O circuit disposed between the address/data buses.

FIG. 15 illustrates that the control panel 616, the coin acceptor 602, the bill acceptor 604, the card reader 608 and the ticket reader/printer 606 may be operatively coupled to the I/O circuit 660, each of those components being so coupled by either a unidirectional or bidirectional, single-line or multiple-line data link, which may depend on the design of the component that is used. The speaker(s) 612 may be operatively coupled to a sound circuit 664, that may comprise a voice- and sound-synthesis circuit or that may comprise a driver circuit. The sound-generating circuit 664 may be coupled to the I/O circuit 660.

As shown in FIG. 15, the components 602, 604, 606, 608, 616, 112 may be connected to the I/O circuit 660 via a respective direct line or conductor. Different connection schemes could be used. For example, one or more of the components shown in FIG. 15 may be connected to the I/O circuit 660 via a common bus or other data link that is shared by a number of components. Furthermore, some of the components may be directly connected to the microprocessor 656 without passing through the I/O circuit 660.

Overall Operation of Gaming Unit

One manner in which one or more of the gaming units 504 (and one or more of the gaming units 512) may operate is described below in connection with a number of flowcharts which represent a number of portions or routines of one or more computer programs, which may be stored in one or more of the memories of the controller 652. The computer program(s) or portions thereof may be stored remotely, outside of the gaming unit 504, and may control the operation of the gaming unit 504 from a remote location. Such remote control may be facilitated with the use of a wireless connection, or by an Internet interface that connects the gaming unit 504 with a remote computer (such as one of the network computers 506, 514) having a memory in which the computer program portions are stored. The computer program portions may be written in any high-level language such as C, C++, C#, Java or the like or any low-level assembly or machine language. By storing the computer program portions therein, various portions of the memories 654, 656 are physically and/or structurally configured in accordance with computer program instructions.

Figure 16:
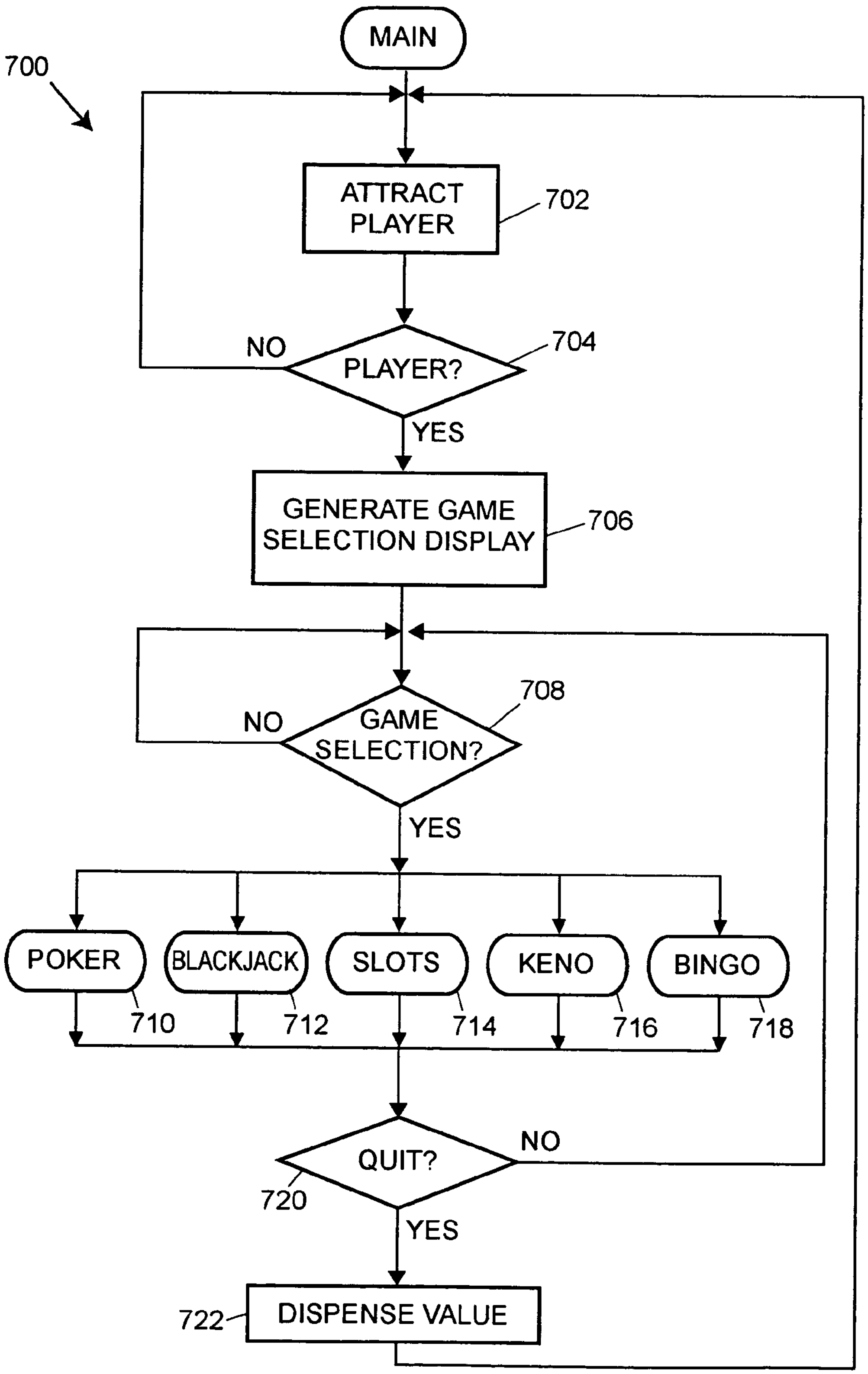
FIG. 16 is a flowchart of an embodiment of a main routine that may be performed during operation of one or more of the gaming units.

FIG. 16 is a flowchart of a main operating routine 700 that may be stored in the memory of the controller 652. Referring to FIG. 16, the main routine 700 may begin operation at block 702 during which an attraction sequence may be performed in an attempt to induce a potential player in a casino to play the gaming unit 504. The attraction sequence may be performed by displaying one or more video images on the display unit 618 and/or causing one or more sound segments, such as voice or music, to be generated via the speakers 612. The attraction sequence may include a scrolling list of games that may be played on the gaming unit 504 and/or video images of various games being played, such as video poker, video blackjack, video slots, video Keno, video Bingo, etc.

During performance of the attraction sequence, if a potential player makes any input to the gaming unit 504 as determined at block 204, the attraction sequence may be terminated and a game-selection display may be generated on the display unit 618 at block 706 to allow the player to select a game available on the gaming unit 504. The gaming unit 504 may detect an input at block 704 in various ways. For example, the gaming unit 504 could detect if the player presses any button on the gaming unit 504; the gaming unit 504 could determine if the player deposited one or more coins into the gaming unit 504; the gaming unit 504 could determine if player deposited paper currency into the gaming unit; etc.

The game-selection display generated at block 706 may include, for example, a list of video games that may be played on the gaming unit 504 and/or a visual message to prompt the player to deposit value into the gaming unit 504. While the game-selection display is generated, the gaming unit 504 may wait for the player to make a game selection. Upon selection of one of the games by the player as determined at block 708, the controller 652 may cause one of a number of game routines to be performed to allow the selected game to be played. For example, the game routines could include a video poker routine 710, a video blackjack routine 712, a slot routine 714, a video Keno routine 716, and a video Bingo routine 718. At block 708, if no game selection is made within a given period of time, the operation may branch back to block 702.

After one of the routines 710, 712, 714, 716, 718 has been performed to allow the player to play one of the games, block 720 may be utilized to determine whether the player wishes to terminate play on the gaming unit 504 or to select another game. If the player wishes to stop playing the gaming unit 504, which wish may be expressed, for example, by selecting a “Cash Out” button, the controller 652 may dispense value to the player at block 722 based on the outcome of the game(s) played by the player. The operation may then return to block 702. If the player did not wish to quit as determined at block 720, the routine may return to block 708 where the game-selection display may again be generated to allow the player to select another game.

It should be noted that although five gaming routines are shown in FIG. 16, a different number of routines could be included to allow play of a different number of games, such as a lottery game or a word-based game. The gaming unit 504 may also be programmed to allow play of different games.

Figure 17:
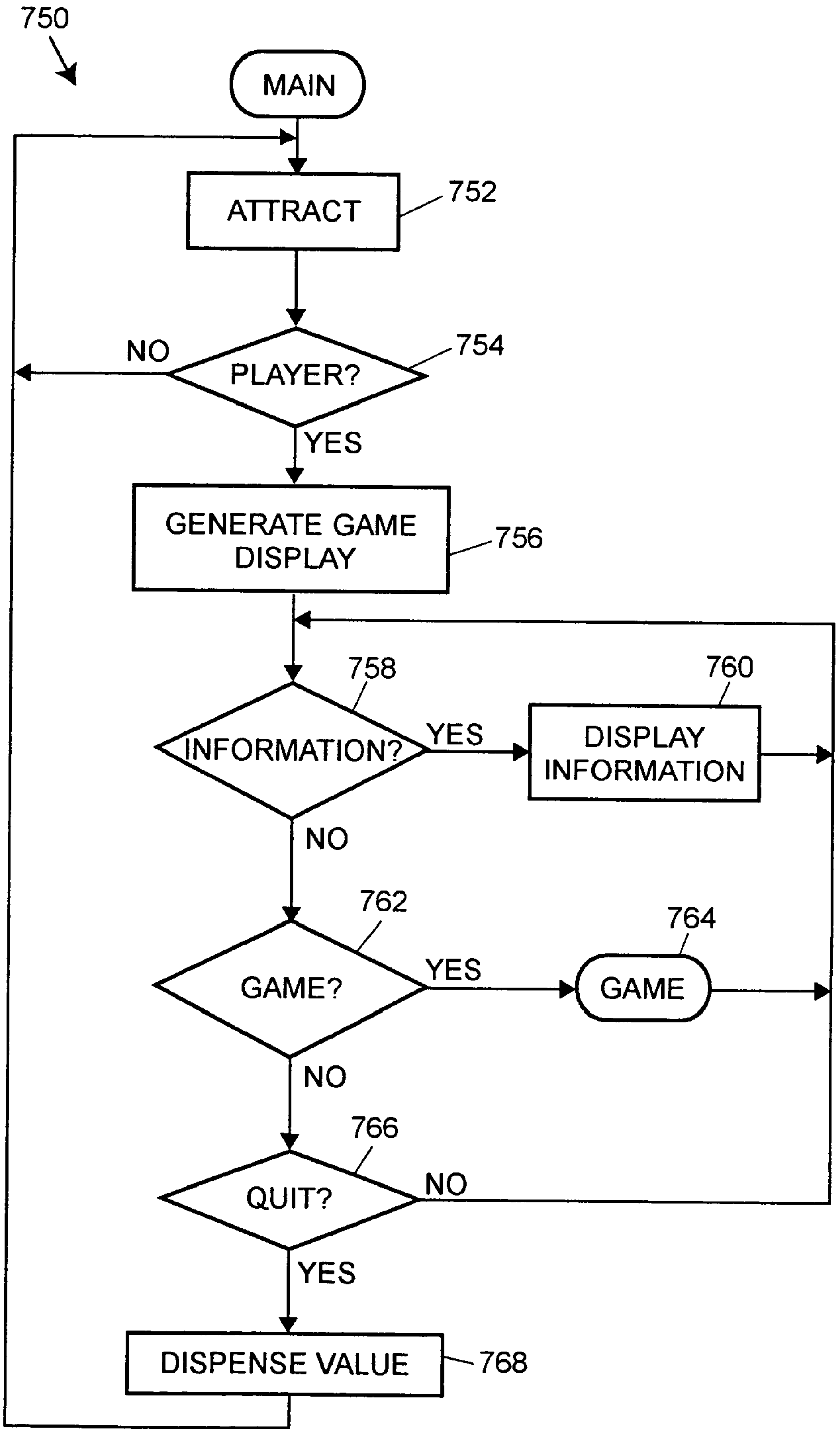
FIG. 17 is a flowchart of an alternate embodiment of a main routine that may be performed during operation of one or more of the gaming units.

FIG. 17 is a flowchart of an alternative main operating routine 750 that may be stored in the memory of the controller 652. The main routine 750 may be utilized for gaming units 504 that are designed to allow play of only a single game or single type of game. Referring to FIG. 17, the main routine 750 may begin operation at block 752 during which an attraction sequence may be performed in an attempt to induce a potential player in a casino to play the gaming unit 504. The attraction sequence may be performed by displaying one or more video images on the display unit 618 and/or causing one or more sound segments, such as voice or music, to be generated via the speakers 612.

During performance of the attraction sequence, if a potential player makes any input to the gaming unit 504 as determined at block 754, the attraction sequence may be terminated and a game display may be generated on the display unit 618 at block 756. The game display generated at block 756 may include, for example, an image of the casino game that may be played on the gaming unit 504 and/or a visual message to prompt the player to deposit value into the gaming unit 504. At block 758, the gaming unit 504 may determine if the player requested information concerning the game, in which case the requested information may be displayed at block 760. Block 762 may be used to determine if the player requested initiation of a game, in which case a game routine 764 may be performed. The game routine 764 could be any one of the game routines disclosed herein, such as one of the five game routines 710, 712, 714, 716, 718, or another game routine.

After the routine 764 has been performed to allow the player to play the game, block 766 may be utilized to determine whether the player wishes to terminate play on the gaming unit 504. If the player wishes to stop playing the gaming unit 504, which wish may be expressed, for example, by selecting a "Cash Out" button, the controller 652 may dispense value to the player at block 768 based on the outcome of the game(s) played by the player. The operation may then return to block 752. If the player did not wish to quit as determined at block 766, the operation may return to block 758.

Video Poker

Figure 18:
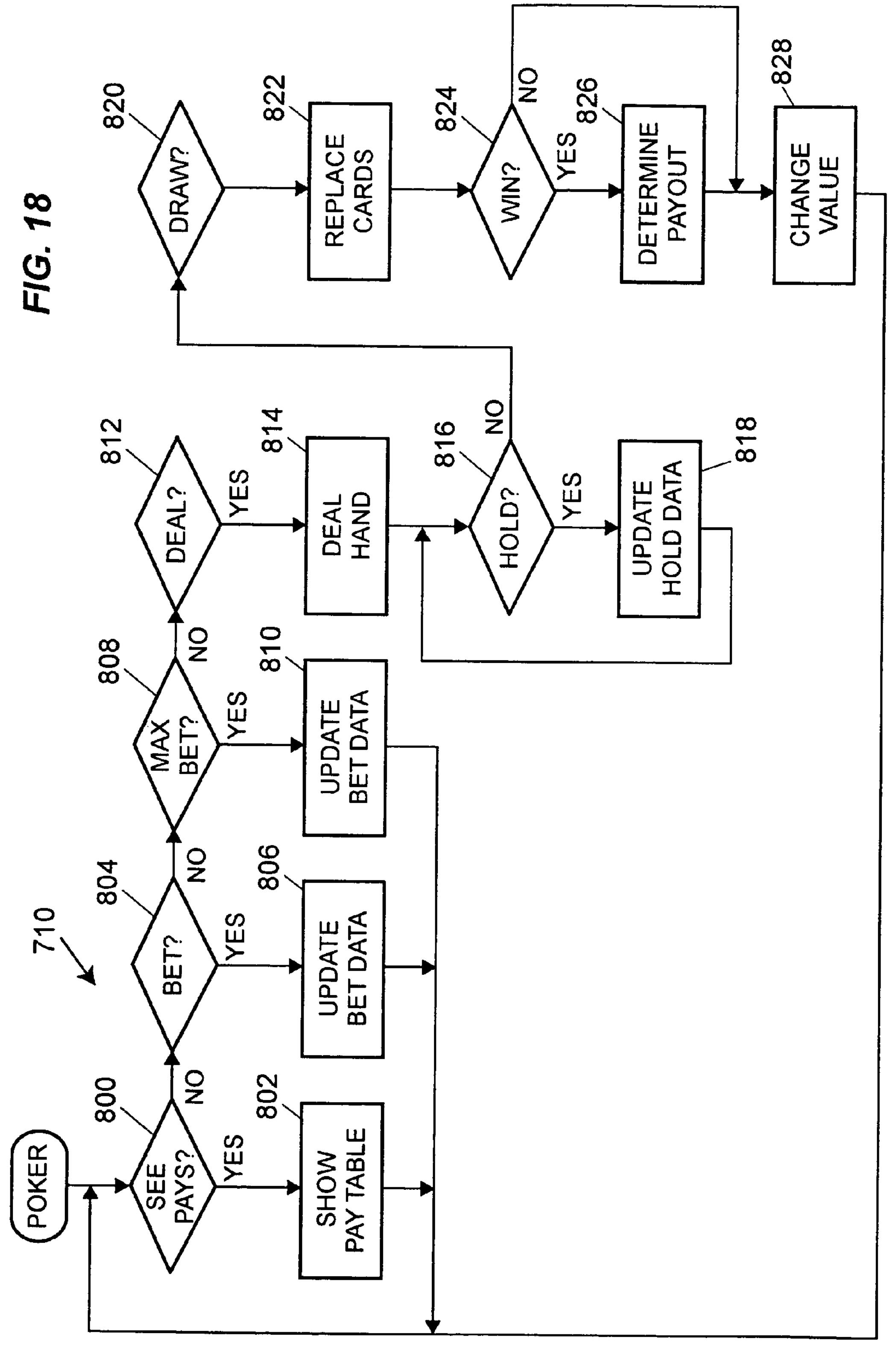
FIG. 18 is a flowchart of an embodiment of a video poker routine that may be performed by one or more of the gaming units.

FIG. 18 is a flowchart of the video poker routine 210 that may be stored in the main program memory 654. Referring to FIG. 18, at block 800, the routine may determine whether the player has requested payout information, which may be referred to as "See Pays", in which case at block 802 the routine may cause one or more pay tables to be displayed on the display unit 618. At block 804, the routine may determine whether the player has made a bet, in which case at block 806 bet data corresponding to the bet made by the player may be stored in the memory of the controller 652. At block 808, the routine may determine whether the player has elected to bet the maximum number of credits, in which case at block 810 bet data corresponding to the maximum allowable bet may be stored in the memory of the controller 652.

At block 812, the routine may determine if the player desires a new hand to be dealt. In that case, at block 814 a video poker hand may be "dealt" by causing the display unit 618 to generate playing card images. After the hand is dealt, at block 816 the routine may determine if the player wishes to "Hold" any cards, in which case data regarding which of the playing card images are to be "held" may be stored in the controller 652 at block 818. If the player selects "Deal/Draw" as determined at block 820, each of the playing card images that was not "held" may be caused to disappear from the display unit 618 and to be replaced by a new, randomly selected, playing card image at block 822.

At block 824, the routine may determine whether the poker hand represented by the playing card images currently displayed is a winner. That determination may be made by comparing data representing the currently displayed poker hand with data representing all possible winning hands, which may be stored in the memory of the controller 652. If there is a winning hand, a payout value corresponding to the winning hand may be determined at block 826. At block 828, the player's cumulative value or number of credits may be updated by subtracting the bet made by the player and adding, if the hand was a winner, the payout value determined at block 826. The cumulative value or number of credits may also be displayed on the display unit 616.

Although the video poker routine 710 is described above in connection with a single poker hand of five cards, the routine 710 may be modified to allow other versions of poker to be played. For example, seven-card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 19:
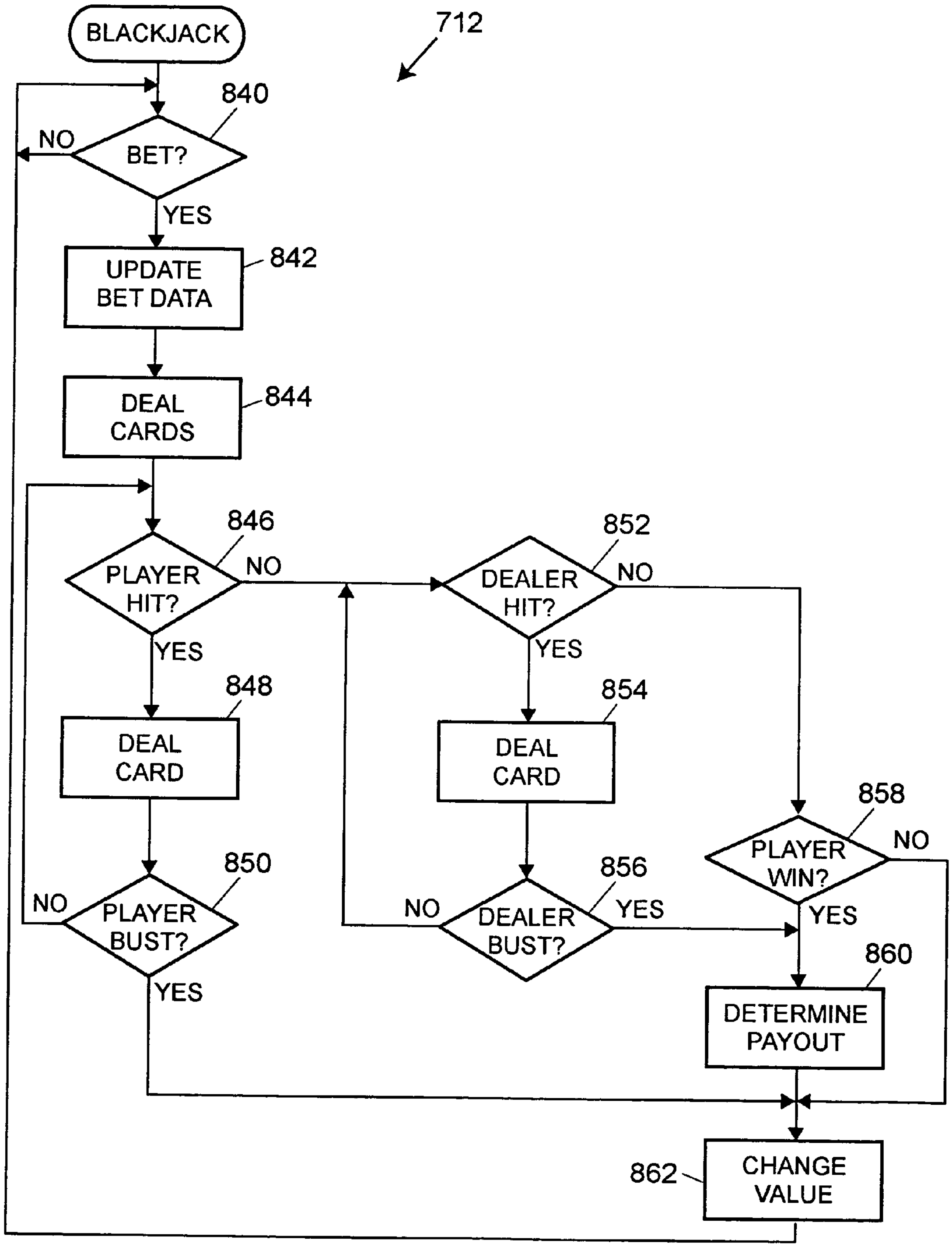
FIG. 19 is a flowchart of an embodiment of a video blackjack routine that may be performed by one or more of the gaming units.

FIG. 19 is a flowchart of the video blackjack routine 712 that may be stored on the main program memory 654. Referring to FIG. 19, the video blackjack routine 712 may begin at block 840 where it may determine whether a bet has been made by the player. For example, the player may choose to wager one credit, multiple credits or the maximum number of credits. At block 842, bet data corresponding to the bet made at block 840 may be stored in the memory of the controller 652. At block 844, a dealer's hand and a player's hand may be "dealt" by making the playing card images appear on the display unit 618.

At block 846, the player may be allowed to be "hit," in which case at block 848 another card will be dealt to the player's hand by making another playing card image appear in the display unit 618. If the player is hit, block 850 may determine if the player has "bust," or exceeded 21. If the player has not bust, blocks 846 and 848 may be performed again to allow the player to be hit again.

If the player decides not to hit, at block 852 the routine may determine whether the dealer should be hit. Whether the dealer hits may be determined in accordance with predetermined rules, such as the dealer always hit if the dealer's hand totals 15 or less. If the dealer hits, at block 854 the dealer's hand may be dealt another card by making another playing card image appear in the display unit 618. At block 856, the routine may determine whether the dealer has bust. If the dealer has not busted, blocks 852, 854 may be performed again to allow the dealer to be hit again.

If the dealer does not hit, at block 858 the outcome of the blackjack game and a corresponding payout may be determined based on, for example, whether the player or the dealer has the higher hand that does not exceed 21. If the player has a winning hand, a payout value corresponding to the winning hand may be determined at block 860. At block 862, the player's cumulative value or number of credits may be updated by subtracting the bet made by the player and adding, if the player won, the payout value determined at block 860. The cumulative value or number of credits may also be displayed in the display unit 618.

Slots

Figure 20:
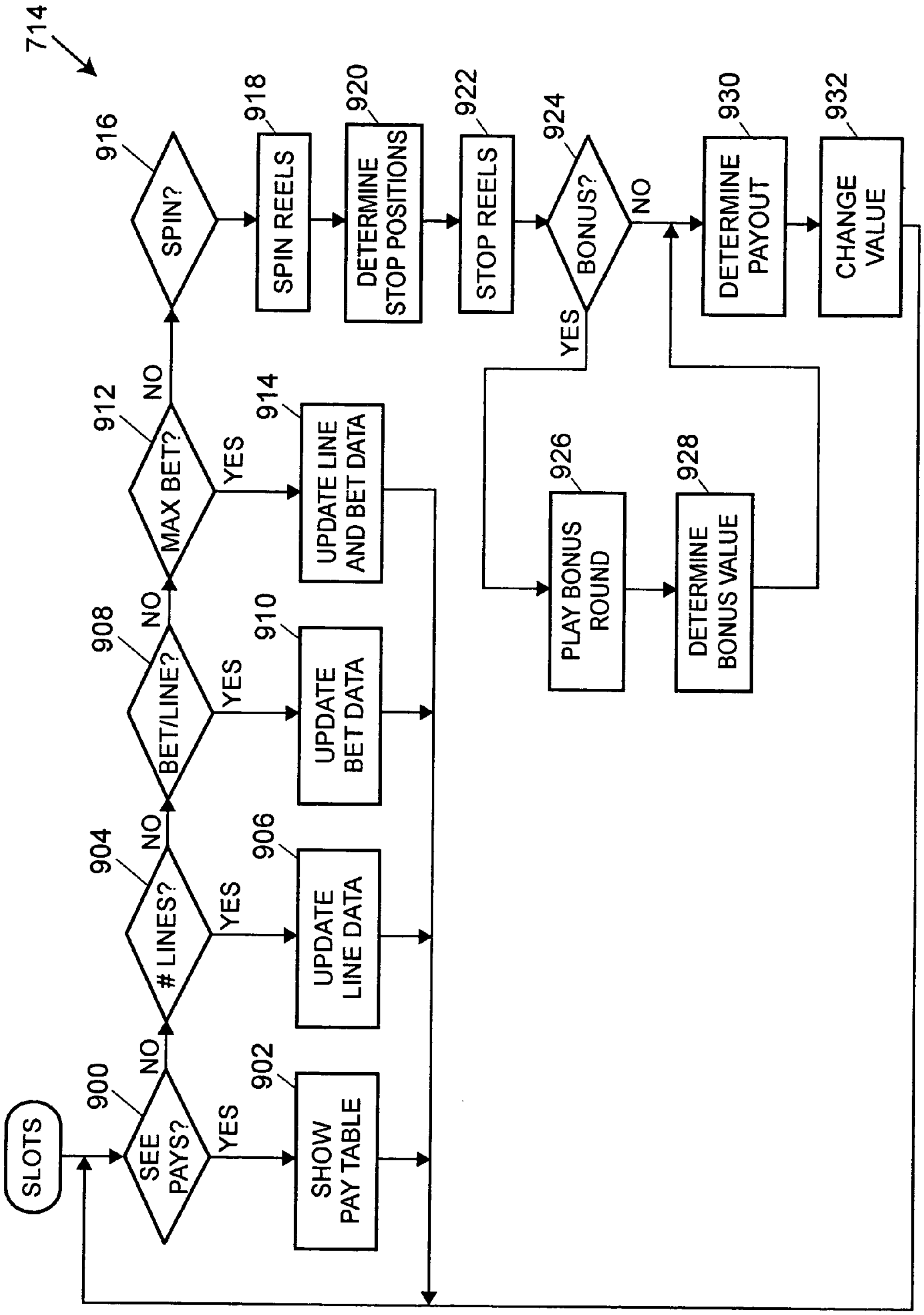
FIG. 20 is a flowchart of an embodiment of a slots routine that may be performed by one or more of the gaming units.

FIG. 20 is a flowchart of the slots routine 714 that may be stored in the main program memory 454. Referring to FIG. 20, at block 900, the routine may determine whether the player has requested payout information, which may be referred to as "See Pays", in which case at block 902 the routine may cause one or more pay tables to be displayed on the display unit 618. At block 904, the routine may determine whether the player has chosen to make a payline-selection, in which case at block 906 data corresponding to the number of paylines selected by the player may be stored in the memory of the controller 652. At block 912, the routine may determine whether the player has made a wager, in which case at block 910 data corresponding to the amount wagered per payline may be stored in the memory of the controller 652. At block 912, the routine may determine whether the player has chosen to make the "Max Bet", in which case at block 914 bet data (which may include both payline data and bet-per-payline data) corresponding to the maximum allowable bet may be stored in the memory of the controller 652.

If the player selects "Spin" as determined at block 916, at block 918 the routine may cause images of slot machine reels to begin "spinning" to simulate the appearance of a plurality of spinning mechanical slot machine reels. At block 920, the routine may determine the positions at which the slot machine reel images will stop, or the particular symbol images that will be displayed when the reel images stop spinning. At block 922, the routine may stop the reel images from spinning by displaying stationary reel images and images of three symbols for each stopped reel image. The virtual reels may be stopped from left to right, from the perspective of the player, or in any other manner or sequence.

The routine may provide for the possibility of a bonus game or round if certain conditions are met, such as the display in the stopped reel images of a particular symbol. If there is such a bonus condition as determined at block 494, the routine may proceed to block 926 where a bonus round may be played. The bonus round may be a different game than slots, and many other types of bonus games could be provided. If the player wins the bonus round, or receives additional credits or points in the bonus round, a bonus value may be determined at block 928. A payout value corresponding to outcome of the slots game and/or the bonus round may be determined at block 930. At block 932, the player's cumulative value or number of credits may be updated by subtracting the bet made by the player and adding, if the slot game and/or bonus round was a winner, the payout value determined at block 930.

Although the above routine has been described as a virtual slot machine routine in which slot machine reels are represented as images on the display unit 618, actual slot machine reels that are capable of being spun may be utilized instead.

Video Keno

Figure 21:
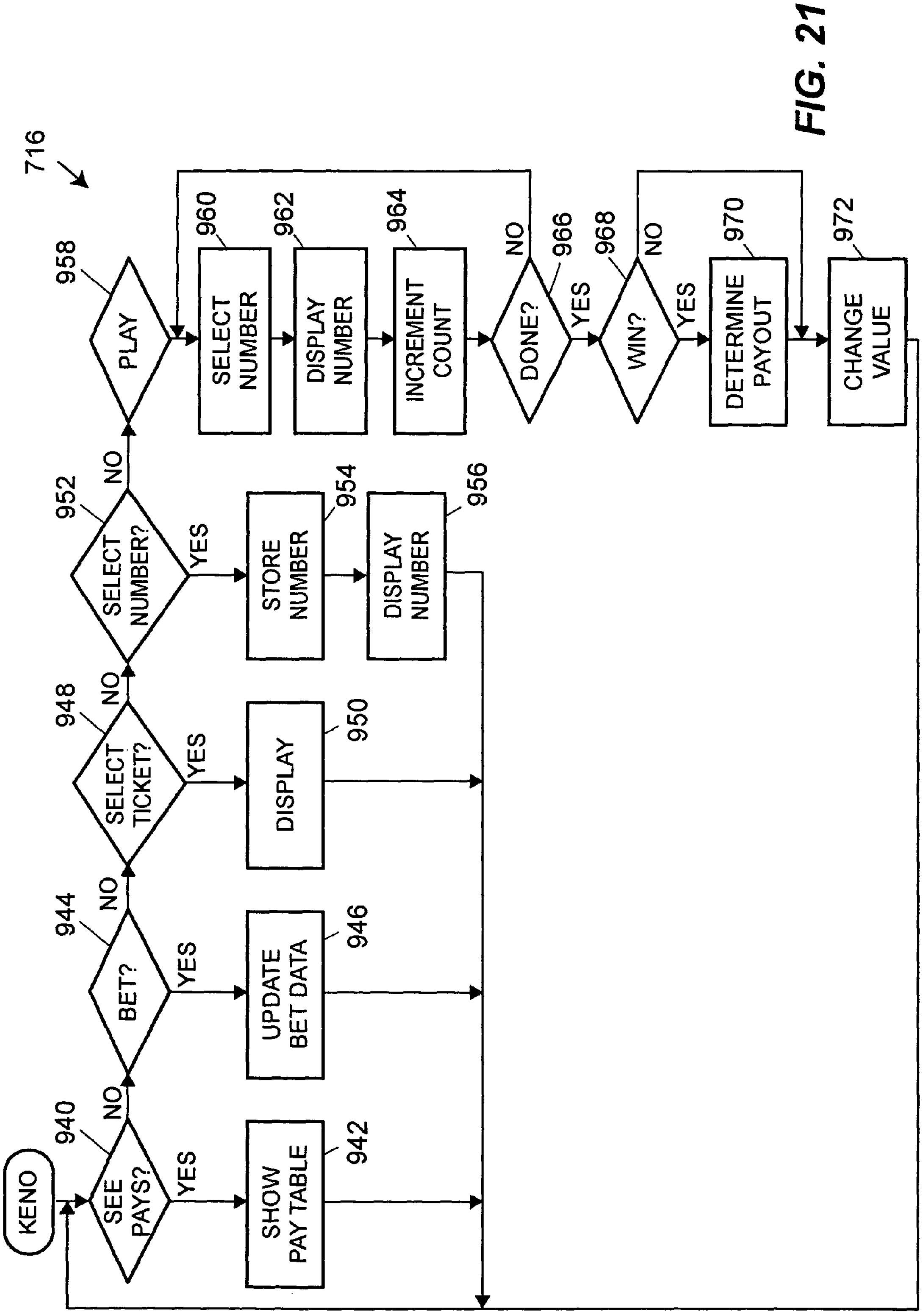
FIG. 21 is a flowchart of an embodiment of a video Keno routine that may be performed by one or more of the gaming units.

FIG. 21 is a flowchart of the video Keno routine 716 that may be stored in the main program memory 654. The Keno routine 716 may be utilized in connection with a single gaming unit 504 where a single player is playing a Keno game, or the Keno routine 716 may be utilized in connection with multiple gaming units 504 where multiple players are playing a single Keno game. In the latter case, one or more of the acts described below may be performed either by the controller 652 in each gaming unit or by one of the network computer 506, 514 to which multiple gaming units 504 are operatively connected.

Referring to FIG. 21, at block 940, the routine may determine whether the player has requested payout information, which may be referred to as "See Pays", in which case at block 942 the routine may cause one or more pay tables to be displayed on the display unit 618. At block 944, the routine may determine whether the player has made a bet. For example, the player may choose to wager one credit, or may choose to bet the maximum number of credits, in which case at block 946 bet data corresponding to the bet made by the player may be stored in the memory of the controller 652. After the player has made a wager, at block 948 the player may select a Keno ticket, and at block 950 the ticket may be displayed on the display unit 618. At block 952, the player may select one or more game numbers, which may be within a range set by the casino. After being selected, the player's game numbers may be stored in the memory of the controller 652 at block 954 and may be included in the image on the display unit 618 at block 856. After a certain amount of time, the Keno game may be closed to additional players (where a number of players are playing a single Keno game using multiple gambling units 504).

If play of the Keno game is to begin as determined at block 958, at block 960 a game number within a range set by the casino may be randomly selected either by the controller 652 or a central computer operatively connected to the controller, such as one of the network computers 506, 514. At block 962, the randomly selected game number may be displayed on the display unit 618 and the display units 618 of other gaming units 504 (if any) which are involved in the same Keno game. At block 964, the controller 652 (or the central computer noted above) may increment a count that keeps track of how many game numbers have been selected at block 960.

At block 966, the controller 652 (or one of the network computers 506, 514) may determine whether a maximum number of game numbers within the range have been randomly selected. If not, another game number may be randomly selected at block 960. If the maximum number of game numbers has been selected, at block 968 the controller 652 (or a central computer) may determine whether there are a sufficient number of matches between the game numbers selected by the player and the game numbers selected at block 960 to cause the player to win. The number of matches may depend on how many numbers the player selected and the particular Keno rules being used.

If there are a sufficient number of matches, a payout may be determined at block 970 to compensate the player for winning the game. The payout may depend on the number of matches between the game numbers selected by the player and the game numbers randomly selected at block 960. At block 972, the player's cumulative value or number of credits may be updated by subtracting the bet made by the player and adding, if the Keno game was won, the payout value determined at block 970. The cumulative value or number of credits may also be displayed in the display unit 618.

Video Bingo

Figure 22:
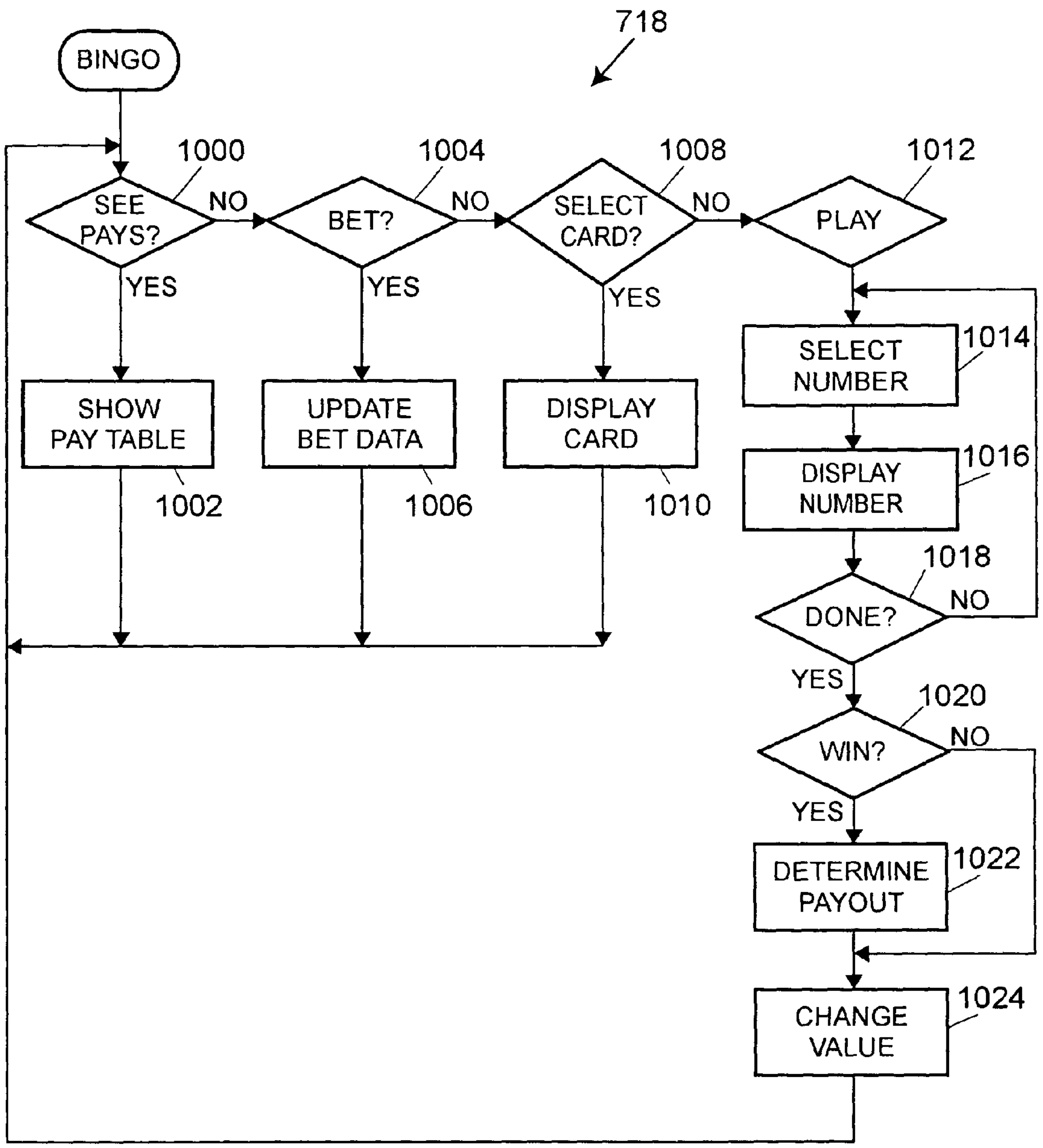
FIG. 22 is a flowchart of an embodiment of a video Bingo routine that may be performed by one or more of the gaming units.

FIG. 22 is a flowchart of the video Bingo routine 718 that may be stored in the main program memory 654. The Bingo routine 719 may be utilized in connection with a single gaming unit 504 where a single player is playing a Bingo game, or the Bingo routine 718 may be utilized in connection with multiple gaming units 504 where multiple players are playing a single Bingo game. In the latter case, one or more of the acts described below may be performed either by the controller 652 in each gaming unit 504 or by one of the network computers 506, 514 to which multiple gaming units 504 are operatively connected.

Referring to FIG. 22, at block 1000, the routine may determine whether the player has requested payout information, which may be referred to as "See Pays", in which case at block 1002 the routine may cause one or more pay tables to be displayed on the display unit 618. At block 1004, the routine may determine whether the player has made a bet. For example, the player may choose to wager one credit, or may choose to bet the maximum number of credits, in which case at block 1006 bet data corresponding to the bet made by the player may be stored in the memory of the controller 652.

After the player has made a wager, at block 1008 the player may select a Bingo card, which may be generated randomly. The player may select more than one Bingo card, and may be limited to selecting a maximum number of Bingo cards. After play is to commence as determined at block 1012, at block 1014 a Bingo number may be randomly generated by the controller 652 or a central computer such as one of the network computers 506, 514. At block 1016, the Bingo number may be displayed on the display unit 618 and the display units 618 of any other gaming units 504 involved in the Bingo game.

At block 1018, the controller 652 (or a central computer) may determine whether any player has won the Bingo game. If no player has won, another Bingo number may be randomly selected at block 1014. If any player has Bingo as determined at block 1018, the routine may determine at block 1020 whether the player playing that gaming unit 504 was the winner. If so, at block 1022 a payout for the player may be determined. The payout may depend on the number of random numbers that were drawn before there was a winner, the total number of winners (if there was more than one player), and the amount of money that was wagered on the game. At block 1024, the player's cumulative value or number of credits may be updated by subtracting the bet made by the player and adding, if the Bingo game was won, the payout value determined at block 1022. The cumulative value or number of credits may also be displayed in the display unit 618.

Multi-Theme Instant Win Casino Game

In a similar manner as the lottery system 100, an instant win game with multiple themes may be implemented in the casino gaming system 500, with the routines 700 and 750 of FIGS. 16 and 17, respectively, being revised in a similar manner as routines 350 and 400 discussed above. The gaming system 500 and routines 350 and 400 may be modified or configured to prompt players to elect whether to play an instant win game, to determine outcomes of the instant win game at the network computers 506, 514 and/or the gaming units 504, 512, to display the outcomes of the instant win game to the player at display 618 or on a ticket printed at a ticket printer 606 using one of a plurality of stored game themes as determined by a game theme indicator, and dispensing value to the player for any prize amount won in the instant win game.

During the course of playing a casino game at gaming units 504, 512, players may be provided with the opportunity to play an instant win game by placing an additional wager or otherwise qualifying to play the instant win game. The gaming units 504 may be configured to display a prompt on the display 618 allowing a player to elect whether to participate in the instant win game. The player may elect to play the instant win game or decline by making the appropriate entry at an input device of the gaming unit 504. If the player elects to participate in the instant win game, an outcome of the instant win game may be associated with each occurrence of the casino game being played by the player, and may require the necessary wager amount for each outcome, or an outcome of the instant win game may be associated with the players session at the gaming unit 504, with the outcome being provided to the player at the time the player cashes out of the gaming unit 504.

When an outcome of the instant win game accompanies each occurrence of the casino gambling game, the necessary wager for the instant win game may be deducted from the player's credits at the gaming unit 504 when the player wagers on the casino gambling game. When the casino gambling game routine executes to allow the player to play the casino gambling game, an outcome of the instant win game may be determined locally at the gaming unit 504, or centrally at another component of the gaming network 500 in similar manners as described above in the lottery network 100 and depending on the configuration of the particular gaming network 500. Once the outcomes of the casino gambling game and the instant win game are determined, the results of the games may be displayed to the player at the display of the gaming unit 504.

Figure 23:
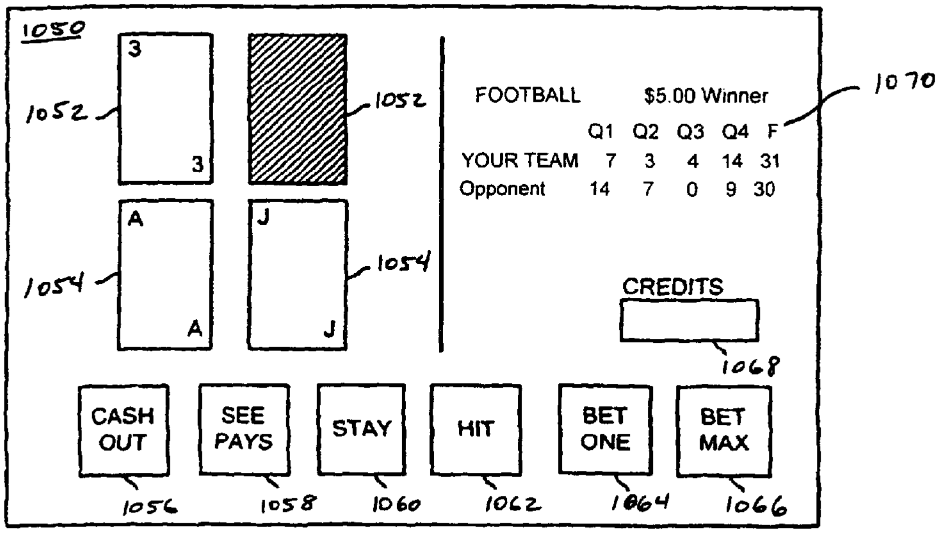
FIG. 23 illustrates an embodiment of a video display at the gaming unit of FIG. 12 displaying blackjack and instant win games.

FIG. 23 is an exemplary display 1050 that may be shown on the display unit 618 during the performance of the video blackjack routine 712 shown schematically in FIG. 19. The display 1050 may include video images 1052 of a pair of playing cards representing a dealer's hand, and video images 1054 of a pair of playing cards representing the player's hand. The "dealer" may be the gaming unit 504. If the display unit 618 is provided with a touch-sensitive screen, a plurality of player-selectable buttons 1056, 1058, 1060, 1062, 1064 and 1066 may form part of the video display 1050, and may also include an area 1068 in which the number of remaining credits or value is displayed. The video display 1050 may further include video images 1070 corresponding to the outcome of the instant win game and being formatted in the one of the plurality of game themes dictated by the game theme indicator. In a similar manner as discussed for the lottery network 100, the game theme indicator may be stored at the gaming unit 504, or may be provided by one of the network computers 506, 514 or other component of the gaming network 500 where the game theme indicator may be stored. As with the lottery instant win game, the same underlying logic may be used to determine the outcomes of the casino instant win game as the displayed game theme is varied by changing the game theme indicator.

Figure 24:
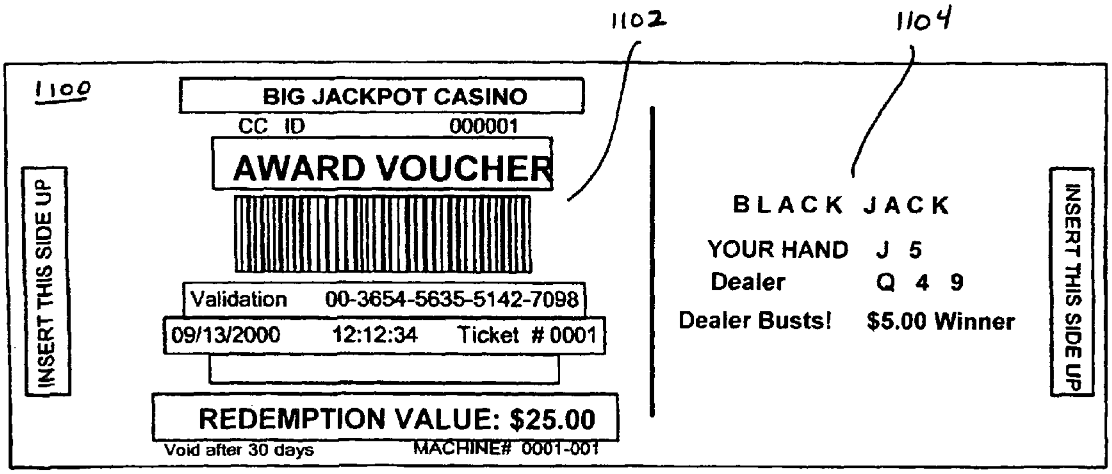
FIG. 24 illustrates an embodiment of a gaming award voucher including an instant win game that may be generated by the gaming unit of FIG. 12.

Alternatively, a single outcome of the instant win game may accompany the player's session at the gaming unit 504, with the outcome of the instant win game being displayed to the player when the player cashes out of the gaming unit 504. The outcome of the instant win game may be determined either at the time the player elects to play the instant win game and stored until the player cashes out, or at the time the player selects the cash out button of the gaming unit 504 or uses all the remaining credits on the gaming unit 504, with the outcome being determined in a similar manner as described above. When the player cashes out, the outcome of the instant win game may be displayed at the display 618 as discussed above. Alternatively, the outcome of the instant win game may be printed on a receipt or voucher printed and dispensed at ticket printer 606. FIG. 24 illustrates an example of a ticket 1100 that may be dispensed by a gaming unit 504, and including the outcome of an instant win game. The ticket 1100 may include indicia 1102 relating to the outcome or cash out value of the ticket 1104, such as textual information relating to money or other prizes won, barcodes or other indicia encoded with information to be read by ticket reader upon redemption. The ticket 1100 may further include indicia 1106 corresponding to the outcome of the instant win game and the one of the plurality of game themes dictated by the game theme indicator. The indicia 1106 may also include a barcode or other encoded indicia indicating any prize awarded for the instant win game or, alternatively, the prize award for the instant win game may be added to any credits or value being redeemed on the ticket 1100 and reflected in the information contained in the indicia 1104.

What is claimed is:

1. A method of conducting an instant win game in combination with a base wagering game, comprising:

receiving a base wagering game entry and a base wagering game wager from a player at a game terminal, which is operatively coupled to a host computer, the base wagering game entry comprising a first set of player selected or randomly generated game indicia as the player's entry into the base wagering game;

receiving an instant win game wager from the player at the game terminal;

storing a game theme indicator in a memory device at either the game terminal or the host computer;

storing a plurality of instant win game outcome display themes that are unrelated to a theme of the base wagering game in a memory device at either the game terminal or the host computer;

selecting one of the plurality of instant win game outcome display themes from the game theme indicator and pairing the selected instant win game outcome display theme with the theme of the base wagering game via the game terminal or host computer;

varying the instant win game outcome display theme with respect to the theme of the base wagering game, via the game terminal or host computer, to provide different instant win game outcome display themes paired with the base wagering game theme to enhance game play;

conducting the instant win game via the game terminal or host computer without use of the first set of game indicia that is used as the player's entry into the base game such that the instant win game indicia are different and distinct from the indicia used in the base game and correspond to the instant win game outcome display theme;

separately generating a second set of game indicia via the game terminal or host computer that is different from the first set of game indicia, the second set of game indicia displaying an outcome of the instant win game such that the instant win game indicia are different and distinct from the indicia used in the base wagering game and correspond to the instant win game outcome display theme;

the second set of game indicia, which is generated via the game terminal or host computer, unrelated to the theme of the base wagering game and being identifiable with one of the plurality of instant win game outcome display themes that is determined by the stored game theme indicator; and awarding the player an instant win game prize corresponding to the outcome of the instant win game via the game terminal.

2. The method of conducting an instant win game in combination with a base wagering game according to claim 1, wherein the instant win game and base wagering game are implemented in a gaming system having a host computer communicatively linked to a plurality of terminal units, the method comprising receiving the base wagering game entry, base wagering game wager and instant win game wager at one of the terminal units.

3. The method of conducting an instant win game in combination with a base wagering game according to claim 2, comprising determining the outcome of the instant win game for the player at one of the host computer and the one of the plurality of terminal units receiving the base wagering game entry, base wagering game wager and instant win game wager.

4. The method of conducting an instant win game in combination with a base wagering game according to claim 2, comprising displaying the outcome of the instant win game to the player at the one of the plurality of terminal units receiving the base wagering game entry, base wagering game wager and instant win game wager.

5. The method of conducting an instant win game in combination with a base wagering game according to claim 4, wherein each of the terminal units includes a ticket printer, the method comprising printing a ticket at the ticket printer of the one the plurality of terminal units, the ticket including the first set of game indicia corresponding to the base wagering game entry and base wagering game wager, and the second set of game indicia corresponding to the outcome of the instant win game with the one of the instant win game outcome display themes corresponding to the stored game theme indicator.

6. The method of conducting an instant win game in combination with a base wagering game according to claim 4, wherein each of the terminal units includes video display device, the method comprising displaying the outcome of the instant win game at the video display device of the one of the terminal units, the outcome of the instant win game being displayed with the one of the instant win game outcome display themes corresponding to the stored game theme indicator.

7. The method of conducting an instant win game in combination with a base wagering game according to claim 1, wherein the instant win game and base wagering game are implemented in a gaming system having a host computer communicatively linked to a plurality of terminal units, the method comprising storing the game theme indicator at one of the host computer and the terminal units.

8. The method of conducting an instant win game in combination with a base wagering game according to claim 1, wherein the instant win game and base wagering game are implemented in a gaming system having a host computer communicatively linked to a plurality of terminal units, the method comprising storing the plurality of instant win game outcome display themes at the plurality of terminal units.

9. The method of conducting an instant win game in combination with a base wagering game according to claim 1, wherein the instant win game and base wagering game are implemented in a gaming system having a host computer communicatively linked to a plurality of terminal units each having a value dispensing unit, the method comprising dispensing the instant win game prize to the player via the value dispensing unit.

10. The method of conducting an instant win game in combination with a base wagering game according to claim 1, wherein the instant win game and the base wagering game are implemented in a terminal unit having an input device, the method comprising receiving the base wagering game entry, base wagering game wager and instant win game wager at the input device of the terminal units.

11. The method of conducting an instant win game in combination with a base wagering game according to claim 10, wherein the terminal unit includes a ticket printer, the method comprising printing a ticket at the ticket printer of the terminal unit, the ticket including the first set of game indicia corresponding to the base wagering game entry and base wagering game wager, and the second set of game indicia corresponding to the outcome of the instant win game with the one of the instant win game outcome display themes corresponding to the stored game theme indicator.

12. The method of conducting an instant win game in combination with a base wagering game according to claim 10, wherein the terminal unit includes a video display device, the method comprising displaying the outcome of the instant win game at the video display device of the terminal unit, the outcome of the instant win game being displayed with the one of the instant win game outcome display themes corresponding to the stored game theme indicator.

13. The method of conducting an instant win game in combination with a base wagering game according to claim 1, wherein the instant win game and base wagering game are implemented in a terminal unit having a value dispensing unit, the method comprising dispensing the instant win game prize to the player via the value dispensing unit.

14. A gaming system for conducting an instant win game in combination with a base wagering game, said gaming system comprising:

a plurality of terminal units, each of the terminal units comprising:

an input device that allows a player to make a plurality of input selections;

a terminal unit memory device;

a currency-accepting mechanism that is capable of allowing the player to deposit a medium of currency;

a value-dispensing mechanism that is capable of dispensing value to the player;

an output device; and a terminal unit controller operatively coupled to a display unit, the input device, the terminal unit memory device, the currency-accepting mechanism, the value-dispensing mechanism, and the output device; and a host computer operatively coupled to the plurality of terminal units, the host computer comprising a host computer memory device and a host computer controller operatively coupled to the host computer memory device, the terminal unit controller being programmed to allow a player to enter a base wagering game entry at the input device, the base wagering game entry comprising a first set of player selected or randomly generated game indicia, the terminal unit controller being programmed to allow a player to make a base wagering game wager and an instant win game wager at the currency-accepting mechanism, one of the terminal unit controller and the host computer controller being programmed to store a game theme indicator at the corresponding one of the terminal unit memory device and the host computer memory device, one of the terminal unit controller and the host computer controller being programmed to store a plurality of instant win game outcome display themes that are unrelated to a theme of the base wagering game at the corresponding one of the terminal unit memory device and the host computer memory device, one of the terminal unit controller and the host computer controller being programmed to select one of the plurality of instant win game outcome display themes from the game theme indicator and pair the selected instant win dame outcome display theme with the theme of the base wagering game;

one of the terminal unit controller and the host computer controller being programmed to vary the instant win game outcome display theme with respect to the theme of the base wagering game to provide different instant win game outcome display themes paired with the base wagering game theme to enhance game play;

one of the terminal unit controller and the host computer controller being programmed to conduct the instant win game and separately generate a second set of game indicia that is different from the first set of game indicia and that displays the outcome of the instant win game without reference to or comparison to the first set of game indicia, the instant win game conducted without use of the first set of game indicia such that the second set of indicia are different and distinct from the first set of indicia used in the base wagering game and correspond to the instant win game outcome display theme, the second set of game indicia unrelated to the theme of the base wagering game and identifiable with one of the plurality of instant win game outcome display themes determined by the game theme indicator, and the terminal unit controller being programmed to display the outcome of the instant win game at the output device and cause the value-dispensing mechanism to dispense an instant win game prize corresponding to the outcome of the instant win game.

15. The gaming system for conducting an instant win game in combination with a base wagering game according to claim 14, wherein the output device comprises a ticket printer, wherein the terminal unit controller is programmed to print a ticket including the first set of game indicia corresponding to the base wagering game entry and base wagering game wager, and the second set of game indicia corresponding to the outcome of the instant win game with the one of the instant win game outcome display themes corresponding to the stored game theme indicator.

16. The gaming system for conducting an instant win game in combination with a base wagering game according to claim 14, wherein the output device comprises a video display device, wherein the terminal unit controller is programmed to display the outcome of the instant win game at the video display device, the outcome being displayed with the one of the instant win game outcome display themes corresponding to the stored game theme indicator.

17. The gaming system for conducting an instant win game in combination with a base wagering game according to claim 14, wherein the host computer controller is programmed to determine the outcome of the instant win game, wherein the host computer controller is programmed to store the game theme indicator at the host computer memory device, wherein the terminal unit controller is programmed to store the plurality of instant win game outcome themes at the terminal unit memory device, and wherein the host computer controller is programmed to transmit the outcome of the instant win game and the game theme indicator to the terminal unit.

18. A terminal unit for conducting an instant win game in combination with a base wagering game, said terminal unit comprising:

an input device that allows the player to make a plurality of input selections;

a memory device;

a currency-accepting mechanism that is capable of allowing the player to deposit a medium of currency;

a value-dispensing mechanism that is capable of dispensing value to the player;

an output device; and a controller operatively coupled to the output unit, the input device, the memory device, the currency-accepting mechanism, the value-dispensing mechanism, and the output device, the controller being programmed to allow a player to enter a base wagering game entry at the input device, the base wagering game entry comprising a first set of player selected or randomly generated game indicia, the controller being programmed to allow a player to make a base wagering game wager and an instant win game wager at the currency-accepting mechanism, the controller being programmed to store a game theme indicator at the memory device and, the controller being programmed to store a plurality of instant win game outcome display themes at the memory device that are unrelated to a theme of the base wagering game, the controller being programmed to select one of the plurality of instant win game outcome display themes from the game theme indicator and pair the selected instant win game outcome display theme with the theme of the base wagering game;

the controller being programmed to vary the instant win game outcome display theme with respect to the theme of the base wagering game to provide different instant win game outcome display themes paired with the base wagering game theme to enhance game play;

the controller being programmed to conduct the instant win game and separately generate a second set of game indicia that is different from the first set of game indicia and that displays the outcome of the instant win game without reference to or comparison to the first set of game indicia, the instant win game conducted without use of the first set of game indicia such that the second set of indicia are different and distinct from the first set of indicia used in the base wagering game and correspond to the instant win game outcome display theme, the second set of game indicia unrelated to the theme of the base wagering game and being identifiable with one of the plurality of instant win game outcome display themes determined by the game theme indicator, and the controller being programmed to display the outcome of the instant win game at the output device and cause the value-dispensing mechanism to dispense an instant win game prize corresponding to the outcome of the instant win game.

19. The terminal unit for conducting an instant win game in combination with a base wagering game according to claim 18, wherein the output device comprises a ticket printer, wherein the controller is programmed to print a ticket including the first set of game indicia corresponding to the base wagering game entry and base wagering game wager, and the second set of game indicia corresponding to the outcome of the instant win game with the one of the instant win game outcome display themes corresponding to the stored game theme indicator.

20. The terminal unit for conducting an instant win game in combination with a base wagering game according to claim 18, wherein the output device comprises a video display device, wherein the controller is programmed to display the outcome of the instant win game at the video display device, the outcome being displayed with the one of the instant win game outcome display themes corresponding to the stored game theme indicator.

* * * * *